(12) United States Patent
Kuperman et al.

(10) Patent No.: US 9,173,410 B2
(45) Date of Patent: Nov. 3, 2015

(54) CROISSANT SHAPING TOOL

(71) Applicant: ABI, Auto-Bake Industries, Ltd., Concord (CA)

(72) Inventors: Alex Kuperman, Thornhill (CA); Jean-Marc Fauteux, Innisfil (CA); Oleksandr Klymenko, North York (CA)

(73) Assignee: ABI, AUTO-BAKE INDUSTRIES LTD., Concord, Ontario (CA)

( * ) Notice: Subject to any disclaimer, the term of this patent is extended or adjusted under 35 U.S.C. 154(b) by 387 days.

(21) Appl. No.: 13/888,572

(22) Filed: May 7, 2013

(65) Prior Publication Data

US 2014/0335214 A1    Nov. 13, 2014

(51) Int. Cl.
*A21C 9/06* (2006.01)
*A21C 9/08* (2006.01)

(52) U.S. Cl.
CPC .................. *A21C 9/088* (2013.01); *A21C 9/063* (2013.01); *A21C 9/08* (2013.01); *Y10S 901/31* (2013.01)

(58) Field of Classification Search
CPC ........... A21C 9/08; A21C 9/063; A21C 9/088
USPC .......... 425/323, 319, 320, 334, 280; 426/499, 426/500
See application file for complete search history.

(56) References Cited

U.S. PATENT DOCUMENTS 4,582,472 A * 4/1986 Hanson ................... 425/139
2013/0059051 A1   3/2013 Bernhardt et al.

FOREIGN PATENT DOCUMENTS

EP        0490190 A1   6/1992
WO   2011144191 A1   11/2011

OTHER PUBLICATIONS

Video of croissant making apparatus, available at https://www.dropbox.com/s/5vqkal7kwpyjj96/20121213_094502.mp4, undated.

* cited by examiner

*Primary Examiner* — Timothy Kennedy
(74) *Attorney, Agent, or Firm* — Quarles & Brady LLP

(57) ABSTRACT

An apparatus for manipulating a food item, the apparatus having a chassis, an actuator, a first jaw, and a second jaw. The actuator is connected to the chassis and rotatable about a pivot. The first jaw is connected to the chassis and mechanically linked to the actuator. The first jaw is further adapted to move along a first arc. The second jaw is also connected to the chassis and mechanically linked to the actuator. The second jaw is also further adapted to move along a second arc. Rotation of the actuator about the pivot in a first direction brings together the first jaw and the second jaw, the first and second jaws moving along the first and second arcs, respectively. Rotation of the actuator in a second direction opposite the first direction brings apart the first jaw and the second jaw, the first and second jaws moving along the first and second arcs, respectively.

13 Claims, 20 Drawing Sheets

CROISSANT SHAPING TOOL

FIELD OF THE DISCLOSURE

The present disclosure relates generally to the field of robot tools, and more particularly, to an apparatus for shaping a croissant and attachment to a delta robot.

BACKGROUND

The traditional preparation of food is oftentimes a labour intensive procedure that requires intricate manipulations and complex maneuvers. For example, preparing food can require, variously, bending, rolling, smoothing, pinching, lifting, stirring, and moving food items or aspects thereof.

Certain food preparation operations are particularly conducive to automation. For example, mechanical mixers and food processors can help reduce the manual effort required to mix and process ingredients. Conveyor belts may be employed, for example, to move items from one location to another.

Other food preparation operations are more complex, and accordingly, more complex machines may be required in order to perform such operations. The preparation of a croissant is one such example. While mixers and other standard machines may be used to prepare the dough and to shape the dough into a tubular shape, a croissant is typically crescent shaped, and in some circumstances, the tips of the croissant are made to overlap or be connected.

There are existing methods of shaping a croissant. For example, one method involves carrying tubular croissants on a conveyor, having such tubular croissants engage with a vertical piston to stop its forward motion, and using specially positioned rollers to bend the tips of the croissant together. This method is, however, very dependent upon the accuracy of the initial placement of the individual piece. If the initial placement of the croissant is incorrect or unexpected, the resulting shape of the croissant is non-optimal. More generally, the motion of bringing together the tips of a croissant, and potentially overlapping such tips, is a complex maneuver not readily possible to effect using simple machines and operations.

Accordingly, there is a need for an apparatus for shaping a croissant which is intended to assist with eliminating or alleviating some of all of the aforementioned problems associated with the prior art approaches.

SUMMARY OF THE INVENTION

In a broad aspect of the present invention, there is provided an apparatus for manipulating a food item, the apparatus comprising: a chassis, an actuator connected to the chassis and rotatable about a pivot; a first jaw connected to the chassis and mechanically linked to the actuator, wherein the first jaw is adapted to move along a first arc; a second jaw connected to the chassis and mechanically linked to the actuator, wherein the second jaw is adapted to move along a second arc; wherein rotation of the actuator about the pivot in a first direction brings together the first jaw and the second jaw, the first and second jaws moving along the first and second arcs, respectively; and wherein rotation of the actuator in a second direction opposite the first direction brings apart the first jaw and the second jaw, the first and second jaws moving along the first and second arcs, respectively.

In an alternative embodiment, the second jaw comprises a scoop that can be elevated, and wherein the scoop is elevated together with rotation of the actuator about the pivot in the first direction.

In an alternative embodiment, the apparatus further comprises a cover connected to the chassis, wherein the cover comprises an inclined track, wherein the second jaw further comprises a roller, wherein the roller and the scoop are connected about a pivot, and wherein the roller engages with the inclined track during rotation of the actuator about the pivot in the first direction so that the scoop is elevated concurrently with such rotation.

In an alternative embodiment, the roller engages with the inclined track during rotation of the actuator about the pivot in the second direction so that the scoop is lowered concurrently with such rotation.

In an alternative embodiment, the food item is a croissant, and wherein the bringing together of the first jaw and the second jaw is adapted to shape the croissant.

In an alternative embodiment, the elevation of the scoop is adapted to cause a first tip of the croissant to overlap a second tip of the croissant.

In an alternative embodiment, the apparatus further comprises a piston connected to the apparatus, and wherein the piston is adapted to press together the first and second tip of the croissant.

In an alternative embodiment, the bringing apart of the first jaw and the second jaw is adapted to release the croissant.

In an alternative embodiment, the apparatus further comprises a robot attachment plate adapted to connected to a robot.

In an alternative embodiment, the robot is a delta robot having a rotation capability.

In an alternative embodiment, rotation of the actuator in the first and second directions may be effected by the delta robot using the rotation capability.

In an alternative embodiment, the apparatus is adapted to be connected to the delta robot so that the chassis is rotationally fixed relative to the delta robot.

In an alternative embodiment, the apparatus further comprises a yoke connected to the actuator, wherein rotation of the yoke effects rotation of the actuator, where the yoke is adapted to be connected to a rotatable arm of the delta robot.

Additional aspects and advantages of the present disclosure will be apparent in view of the description which follows. It should be understood, however, that the detailed description, while indicating embodiments of the disclosure, are given by way of illustration only, since various changes and modifications within the spirit and scope of the disclosure will become apparent to those skilled in the art from this detailed description.

BRIEF DESCRIPTION OF THE DRAWINGS

With reference to embodiments thereof, the invention will next be described in relation to the drawings, which are intended to be non-limiting examples of various embodiments of the present invention, in which.

DETAILED DESCRIPTION

In the following description, details are set forth to provide an understanding of illustrative embodiments of the invention. In some instances, certain components, devices, steps, software, hardware, structures, connections, and techniques have not been described or shown in detail in order not to obscure the illustrative embodiments of the invention.

Figure 9A:
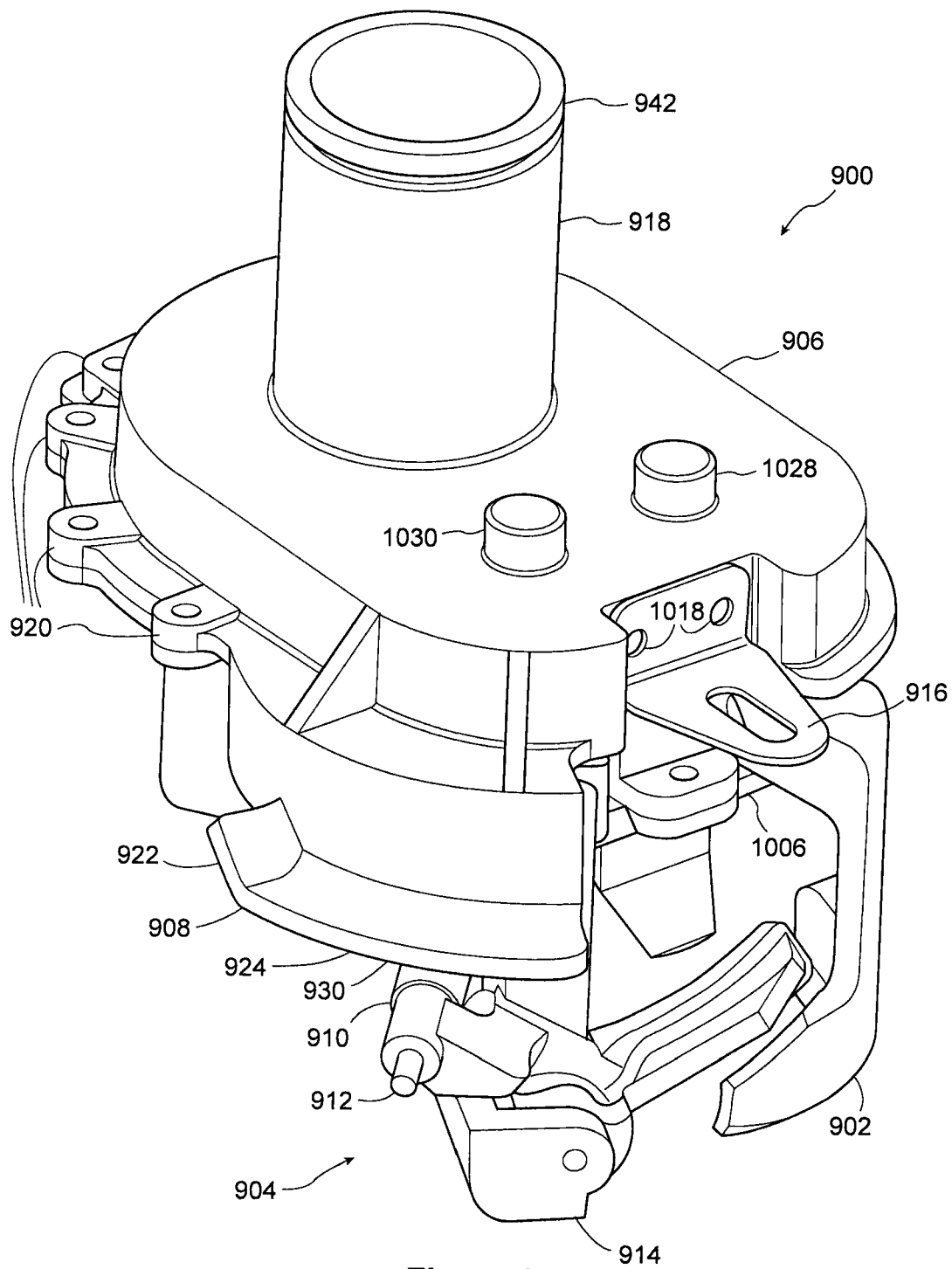
FIG. 9A is a perspective view from the above and to the left of a croissant tool in accordance with a second illustrative embodiment of the present invention.
Figure 9B:
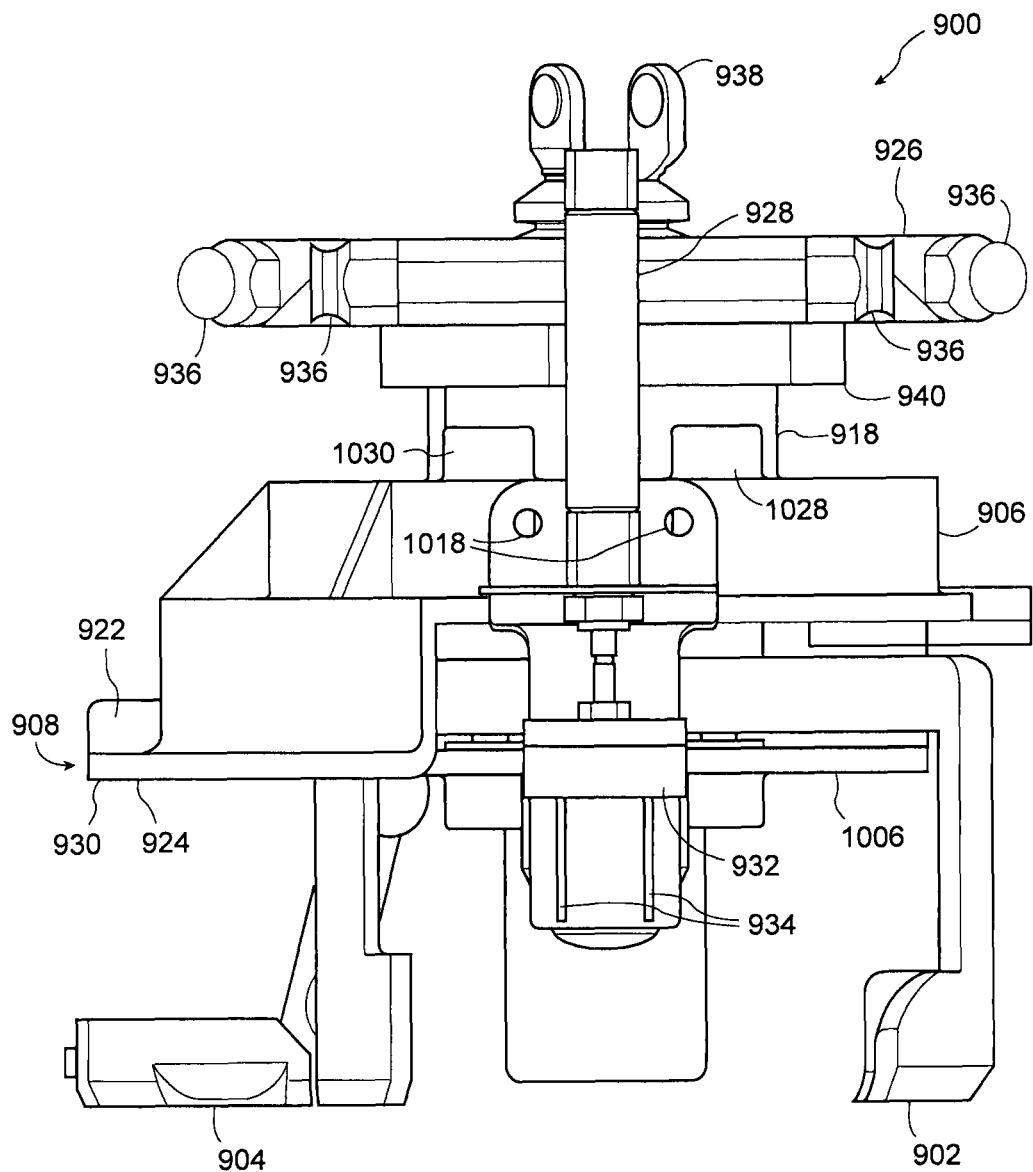
FIG. 9B is a front view of the croissant tool depicted by FIG. 9A.
Figure 9C:
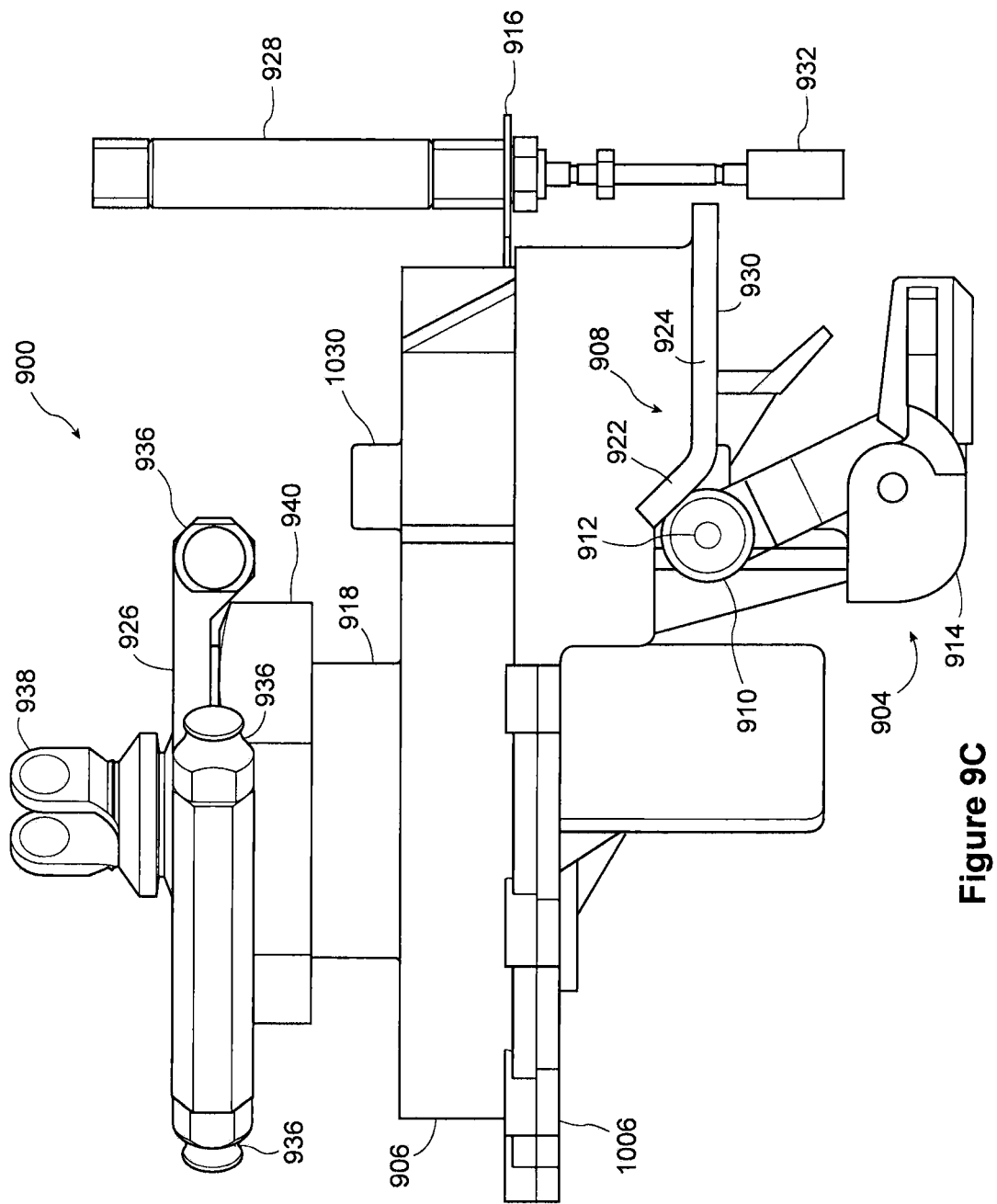
FIG. 9C is a side view of the croissant tool depicted by FIG. 9A.

With reference to FIGS. 9A-C, 10 and 11, there is illustrated a croissant tool 900. Croissant tool 900 generally comprises cover 906 positioned overtop of and interconnected to chassis 1006 and having left jaw 902 and right jaw 904 protruding therefrom. FIGS. 9B and 9C further depict robot attachment plate 926 and piston 928 (not depicted in FIGS. 9A, 10, and 11).

Figure 10:
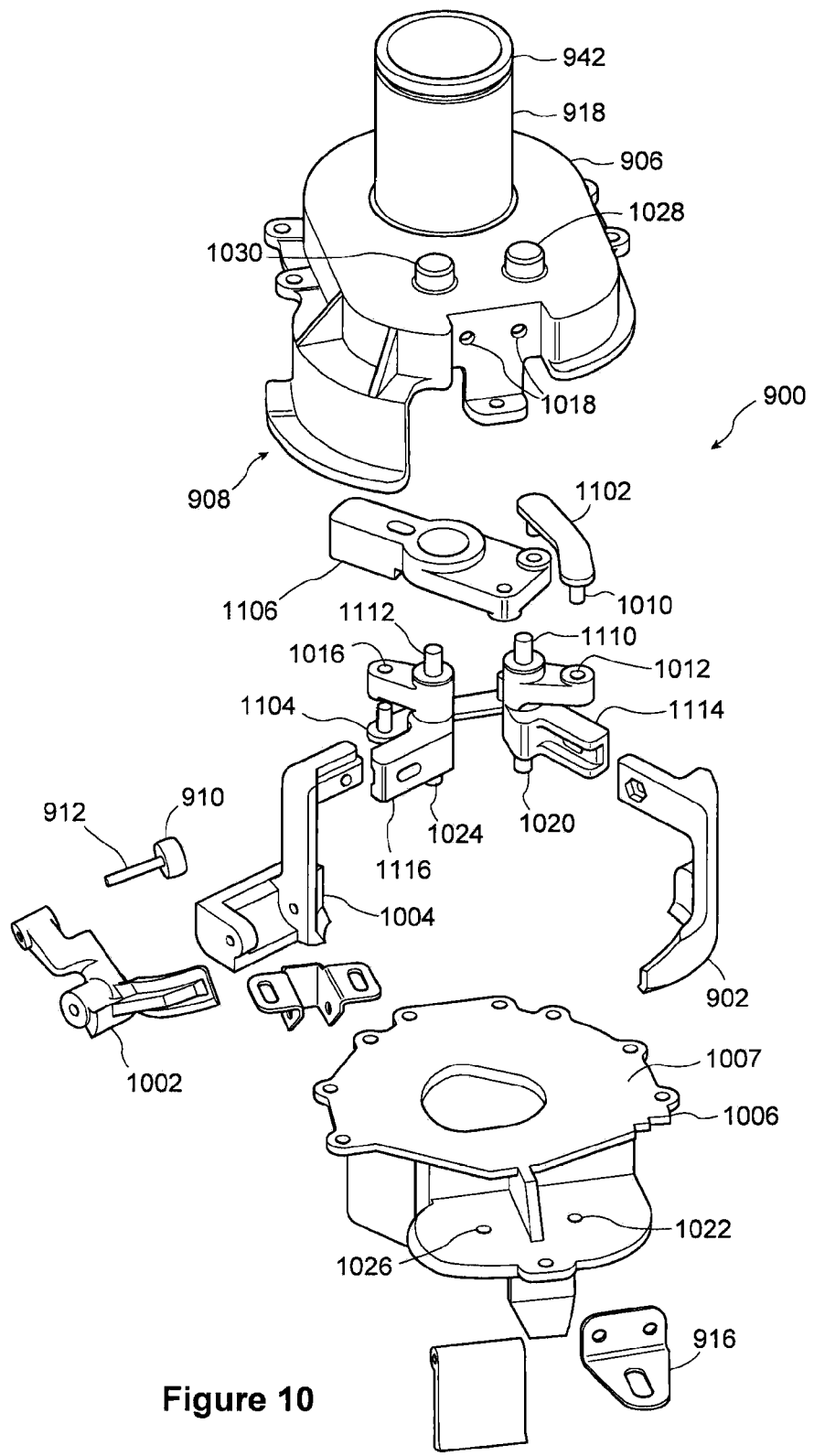
FIG. 10 is an exploded view of the croissant tool depicted by FIG. 9A.

FIG. 10 depicts the various components of croissant tool 900 (excluding robot attachment plate 926 and piston 928) in an exploded view. Chassis 1006 provides a base to which the various other components connect, as described in greater detail herein.

Figure 15:
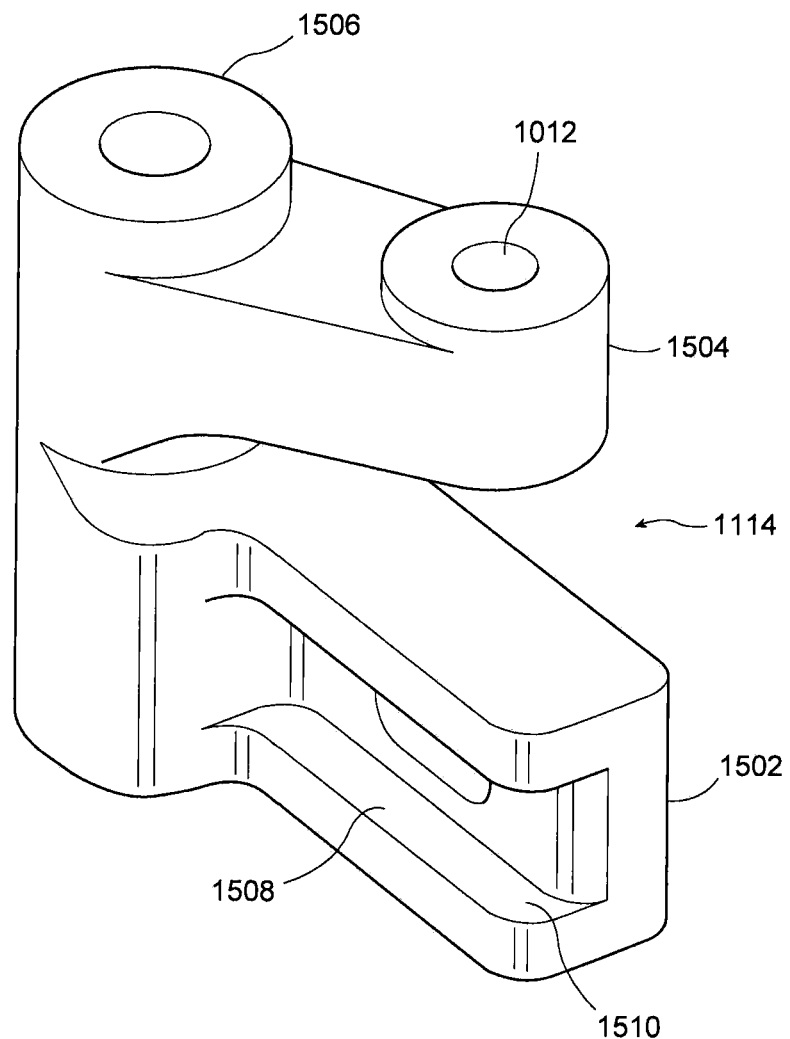
FIG. 15 is a perspective view of the right jaw coupler of the croissant tool depicted by FIG. 9A.
Figure 17:
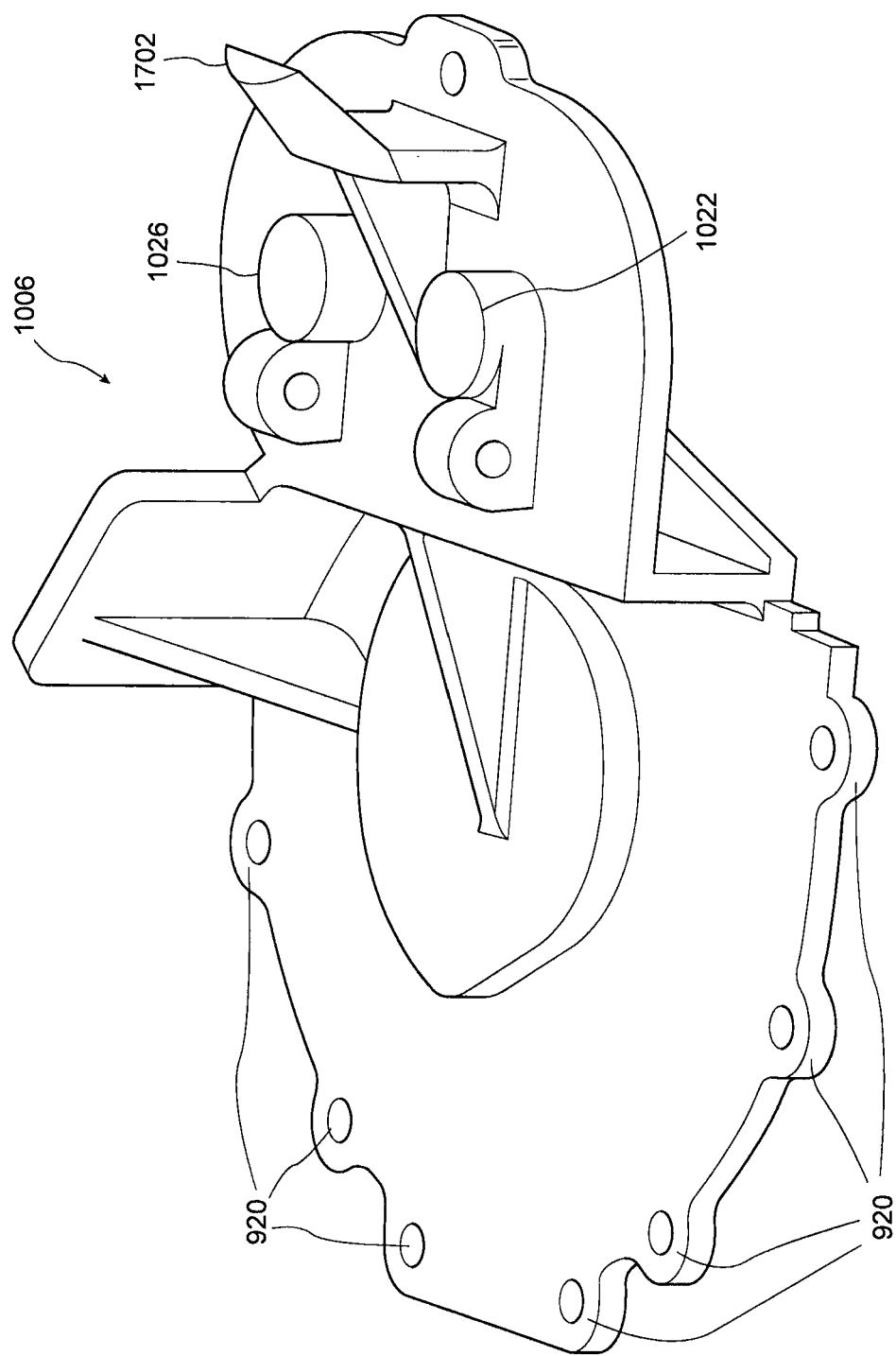
FIG. 17 is a perspective view from the bottom of the chassis of the croissant tool depicted by FIG. 9A.

Right jaw coupler 1114 (as depicted in FIG. 15 in isolation) is positioned overtop right jaw shaft lower mounting hole 1022 of chassis 1006. Right jaw shaft 1110 passes through central portion 1506 of right jaw coupler 1114 so that a portion protrudes therefrom as right shaft peg 1020. Right shaft peg 1020 is sized and adapted to fit within right jaw shaft lower mounting hole 1022. As depicted by FIG. 17, the lower end of right jaw shaft lower mounting hole 1022 is closed, therefore providing support to right jaw shaft 1110 when positioned within right jaw shaft lower mounting hole 1022. Such configuration permits right jaw coupler 1114 to freely pivot about right jaw shaft 1110.

Figure 13:
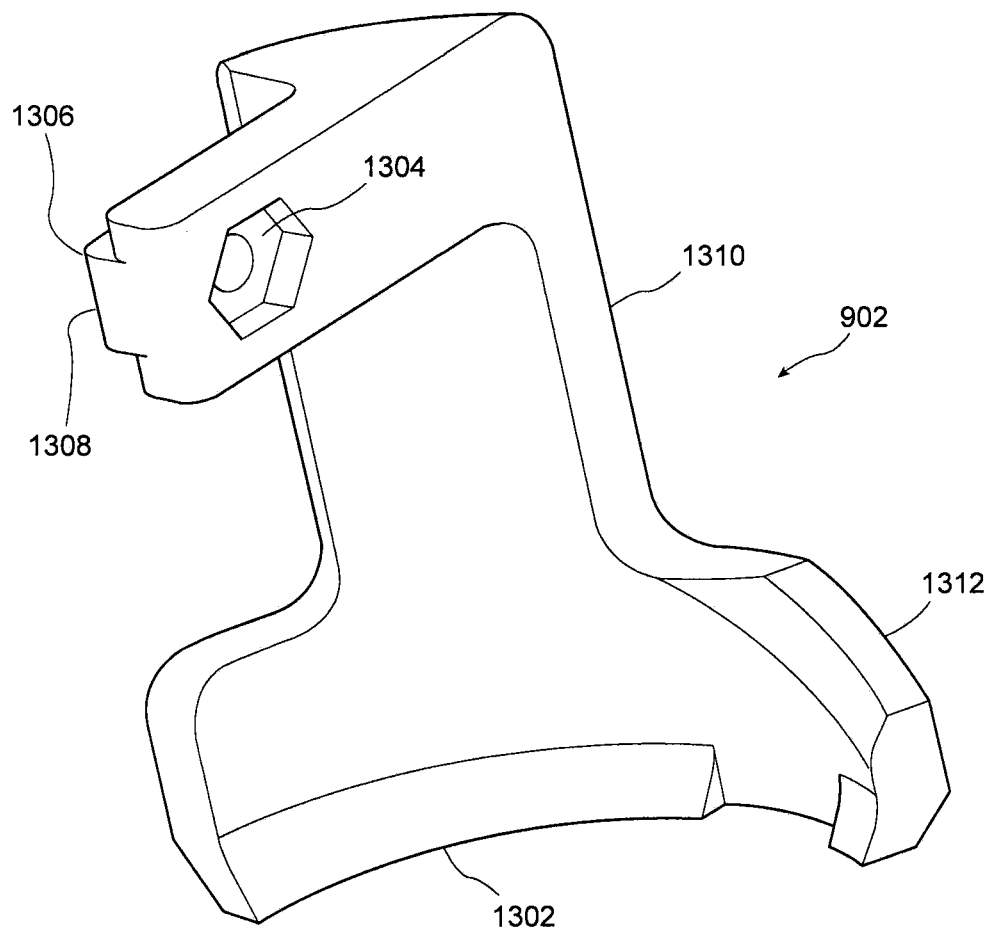
FIG. 13 is a perspective view of the right jaw of the croissant tool depicted by FIG. 9A.

Lower connector 1502 of right jaw coupler 1114 extends perpendicularly from central portion 1506 of right jaw coupler 1114 and has a mating component 1508 configured to mate with corresponding mating component 1308 of right jaw 902 (as depicted in FIG. 13 in isolation). Mating components 1508 and 1308 may have holes or other components designed to permit lower connector 1502 of right jaw coupler 1114 to be connected to right jaw 902. For example, right jaw 902 may have bolt hole 1304 for permitting a bolt (not shown) to be inserted therewithin, to pass through lower connector 1502 of right jaw coupler 1114, and to be connected to a nut (not shown) to strongly connect lower connector 1502 of right jaw coupler 1114 and right jaw 902. Right jaw 902 may also have projection 1306 sized and adapted to fit within depression 1510 of right jaw coupler 1114. Projection 1306 and depression 1510 may be adapted to permit a limited amount of longitudinal adjustment so that right jaw 902 may be configured to be at a varied distance away from right jaw shaft 1110.

More generally, right jaw 902 may comprise, mating component 1308 and right jaw arm 1310 extending perpendicularly away from mating component 1308. Right jaw arm 1310 may comprise curved portion 1312 having right jaw lip 1302 positioned along a lower edge thereof. As described herein, curved portion 1312 and right jaw lip 1302 may be configured to aid in moving and shaping a croissant.

Figure 16:
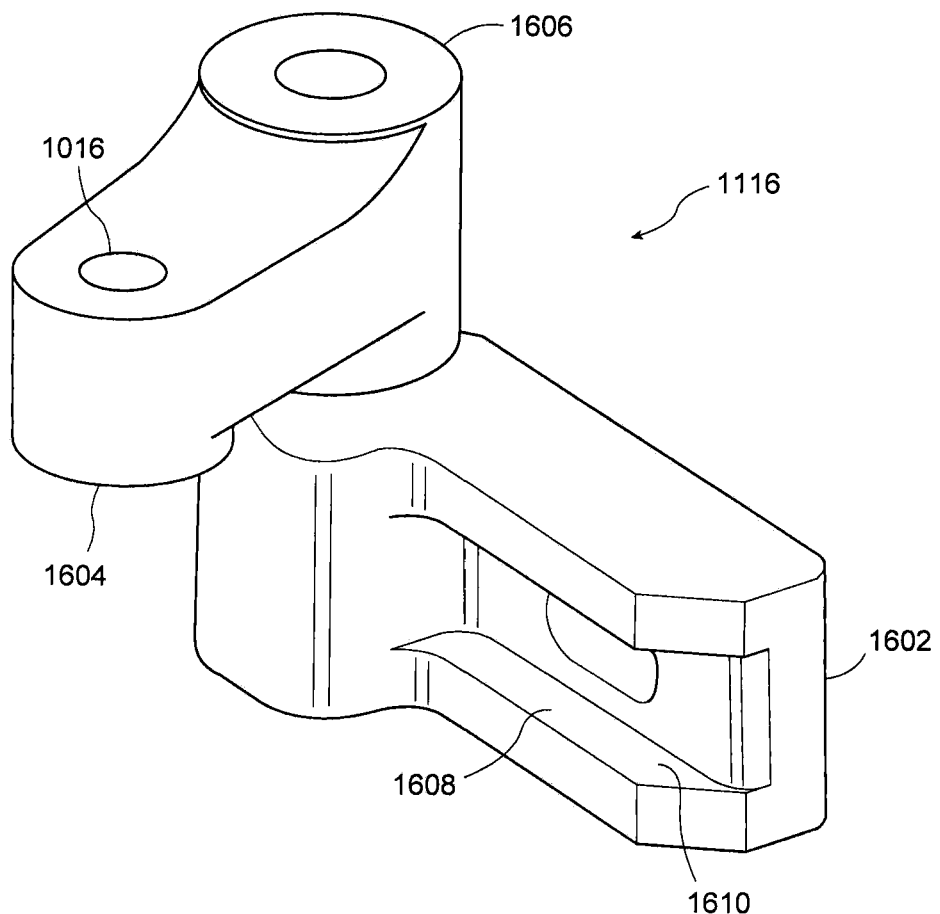
FIG. 16 is a perspective view of the left jaw coupler of the croissant tool depicted by FIG. 9A.

Left jaw coupler 1116 (as depicted in FIG. 16 in isolation) is positioned overtop left jaw shaft lower mounting hole 1026 of chassis 1006. Left jaw shaft 1112 passes through central portion 1606 of left jaw coupler 1116 so that a portion protrudes therefrom as left shaft peg 1024. Left shaft peg 1024 is sized and adapted to fit within left jaw shaft lower mounting hole 1026. As depicted by FIG. 17, the lower end of left jaw shaft lower mounting hole 1026 is closed, therefore providing support to left jaw shaft 1112 when positioned within left jaw shaft lower mounting hole 1026. Such configuration permits left jaw coupler 1116 to freely pivot about left jaw shaft 1112.

Figure 14:
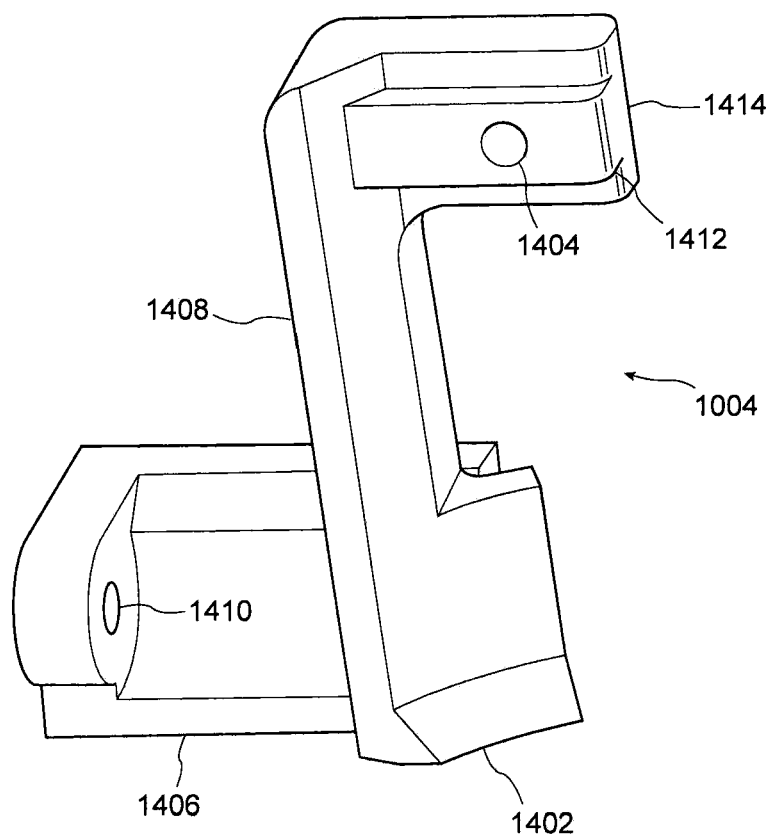
FIG. 14 is a perspective view of the left jaw mount of the croissant tool depicted by FIG. 9A.

Lower connector 1602 of left jaw coupler 1116 extends perpendicularly from central portion 1606 of left jaw coupler 1116 and has a mating component 1608 configured to mate with corresponding mating component 1414 of left jaw mount 1004 (as depicted in FIG. 14 in isolation). Mating components 1608 and 1414 may have holes or other components designed to permit lower connector 1602 of left jaw coupler 1116 to be connected to left jaw mount 1004. For example, left jaw mount 1004 may have bolt hole 1404 for permitting a bolt (not shown) to be inserted therewithin, to pass through lower connector 1602 of left jaw coupler 1116, and to be connected to a nut (not shown) to strongly connect lower connector 1602 of left jaw coupler 1116 and left jaw mount 1004. Left jaw mount 1004 may also have projection 1412 sized and adapted to fit within depression 1610 of left jaw coupler 1116. Projection 1412 and depression 1610 may be adapted to permit a limited amount of longitudinal adjustment so that left jaw mount 10004 may be configured to be at a varied distance away from left jaw shaft 1112.

Left jaw arm 1408 extends downwards perpendicularly from mating component 1414. Bearing chamber 1406 extends perpendicularly from left jaw arm 1408 in the direction opposite the direction that mating component 1414 extends from left jaw arm 1408.

Bearing cylinder 1204 is sized and adapted to fit within bearing chamber 1406 so as to permit rotation therewithin. A shaft (not depicted) may pass through a central hole 1206 of bearing cylinder 1204 as well as corresponding holes within bearing chamber 1406 (e.g. hole 1410). Such shaft may serve to retain bearing cylinder 1204 within bearing chamber 1406, while permitting bearing cylinder 1204 to freely pivot thereabout.

Bearing cylinder 1204 constitutes the central component of left jaw lever 1002. Left jaw lever arm 1208 extends upwardly away from bearing cylinder 1204. Left jaw lever scoop 1210 extends horizontally away from bearing cylinder 1204 such that an obtuse angle is formed between left jaw lever arm 1208 and left jaw lever scoop 1210. Left jaw lever scoop 1214 may comprise curved portion 1214 having left jaw lever lip 1202 positioned along a lower edge thereof. As described herein, curved portion 1214 and left jaw lever lip 1202 may be configured to aid in moving and/or lifting and/or shaping a croissant.

The combination of bearing cylinder 1204 within bearing chamber 1406 comprises pivot 914 about which the whole of left jaw lever 1002 can rotate a limited amount. Left jaw lever 1002 is depicted in a slightly raised position in FIGS. 9A and 11 as left jaw lever scoop 1210 is angled slightly upwards relative to a surface (not depicted).

The end of left jaw lever arm 1208 distal to bearing cylinder 1204 has hole 1212 configured to permit shaft 912 to pass therethrough. Shaft 912 may be configured so that roller 910 is attached to one end thereof. Such configuration permits roller 910 and shaft 912 to freely rotate. For convenience when referring to such combination of components, left jaw mount 1004, left jaw lever 1002, shaft 912, and roller 910 jointly comprise left jaw 904.

Left jaw lever 1002 and left jaw mount 1004 may also have, among other things, left jaw lever lip 1202 and left jaw mount lip 1402, both such lips positioned along the lower edge of left jaw lever 1002 (or more specifically, curved portion 1214 thereof) and left jaw mount 1004, respectively. As described herein, such lips may be configured to aid in moving a croissant and/or lifting and/or shaping a croissant.

Returning to FIGS. 10 and 11, right jaw linkage 1102 connects right jaw coupler 1114 and actuator bracket 1106. Similarly, left jaw linkage 1104 connects left jaw coupler 1116 and actuator bracket 1106. Such connections are shown in greater detail in FIG. 10. In particular, right jaw linkage 1102 is a substantially planar connector having downward projecting pegs at either end, such as right jaw linkage peg 1010. Such pegs are sized and adapted to fit into corresponding holes of right jaw coupler 1114 and actuator bracket 1106. For example, right jaw linkage peg 1010 is sized and adapted to fit into right jaw coupler hole 1012 of upper connector 1504 of right jaw coupler 1114. Similarly, left jaw linkage 1104 is a substantially planar connector having upward projecting pegs at either end, such as left jaw linkage peg 1014. Such pegs are sized and adapted to fit into corresponding holes of left jaw coupler 1016 and actuator bracket 1106—for example, left jaw linkage peg 1014 is sized and adapted to fit into left jaw coupler hole 1016 of upper connector 1604 of left jaw coupler 1016. For convenience when referring to such combination of components, right jaw linkage 1102, left jaw linkage 1104, right jaw coupler 1114, left jaw coupler 1116, right jaw shaft 1110, and left jaw shaft 1112 jointly comprise linkage assembly 1008 that mechanically connects actuator bracket 1106 to left jaw 904 and right jaw 902.

Additionally, an upper peg of right jaw shaft 1110 protruding from right jaw coupler 1114 is sized and adapted to fit within right jaw shaft upper mounting hole 1028 of cover 906, and an upper peg of left jaw shaft 1112 protruding from left jaw coupler 1116 is configured to fit within left jaw shaft upper mounting hole 1030 of cover 906. The openings of holes 1028, 1030 are obscured in FIG. 10, but are analogous to holes 1022, 1026 positioned in chassis 1006. When chassis 1006 and cover 906 are interconnected as depicted in FIGS. 9A-9C, both ends of shafts 1110 and 1112 are positioned within corresponding holes (namely, holes 1022, 1026, 1028 and 1030), thereby retaining shafts 1110 and 1112 while permitting right jaw coupler 1114 and left jaw coupler 1116 to freely rotate therearound.

Actuator bracket 1106 lies in a plane substantially parallel to top face 1007 of chassis 1006, and is configured to rotate within such plane about a main pivot (not depicted) passing through hole 1108 in actuator bracket 1106.

Figure 11:
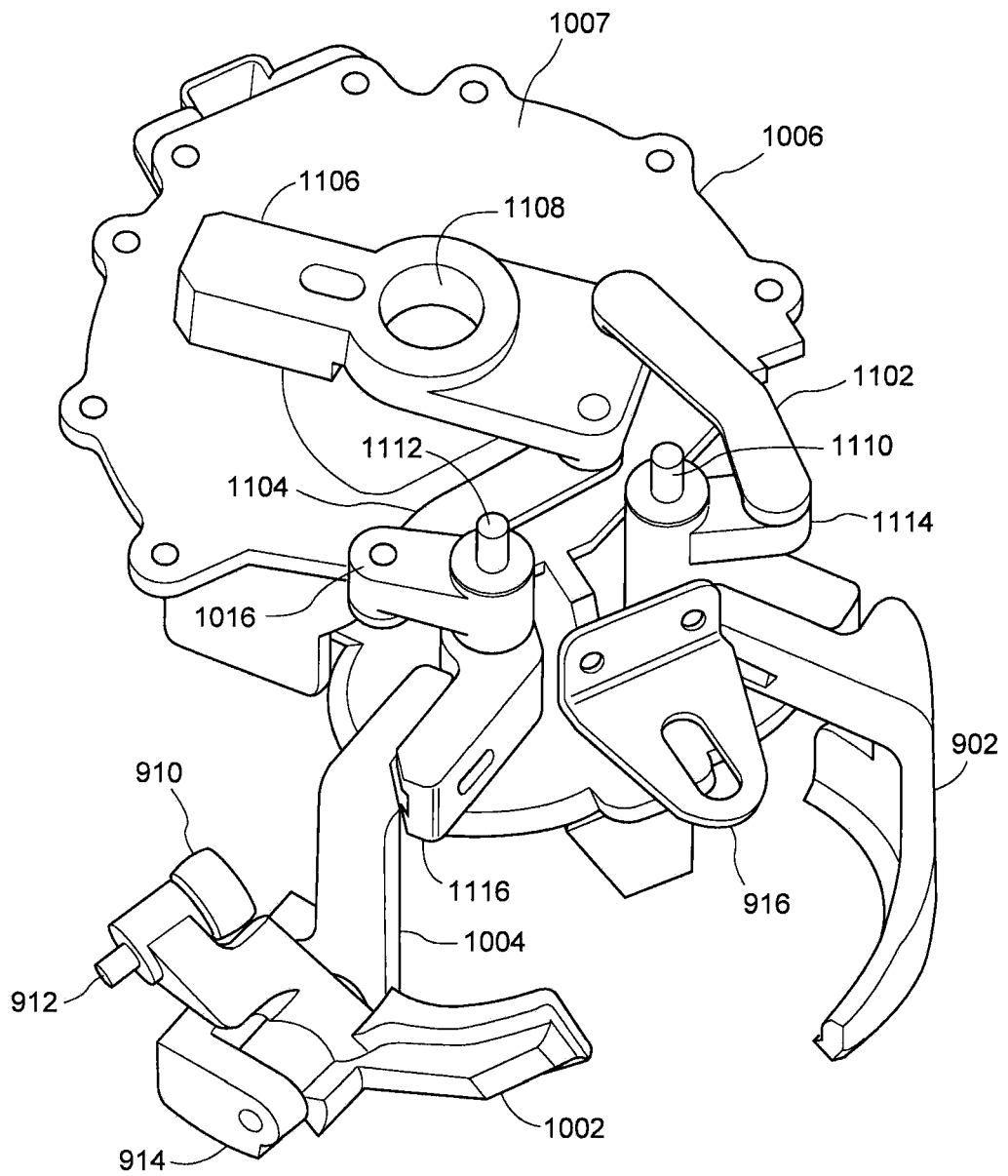
FIG. 11 is a perspective view from the above and to the left of the croissant tool depicted by FIG. 9A, with its cover removed.

With reference to FIG. 11, if actuator bracket 1106 is rotated clockwise (about the main pivot), by means of linkage assembly 1008, left jaw 904 and right jaw 902 are brought forward toward the front of croissant tool 900. In particular, the clockwise rotation of actuator bracket 1106, through left jaw linkage 1104, causes left jaw coupler 1116 to rotate in a counter-clockwise direction, which in turn, as left jaw coupler 1116 is connected to left jaw 904, causes left jaw 904 to travel in a counter-clockwise direction along an arc centered about left jaw shaft 1112. The clockwise rotation of actuator bracket 1106 similarly, through right jaw linkage 1102, causes right jaw coupler 1114 to rotate in a clockwise direction, which in turn, as right jaw coupler 1114 is connected to right jaw 902, causes right jaw 902 to travel in a clockwise direction along an arc centered about right jaw shaft 1110.

Correspondingly, if actuator bracket 1106 is rotated counter-clockwise (about the main pivot), by means of linkage assembly 1008, left jaw 904 and right jaw 902 are brought backward towards the rear of croissant tool 900. In particular, the counter-clockwise rotation of actuator bracket 1106, through left jaw linkage 1104, causes left jaw coupler 1116 to rotate in a clockwise direction, which in turn, as left jaw coupler 1116 is connected to left jaw 904, causes left jaw 904 to travel in a clockwise direction along an arc centered about left jaw shaft 1112. The counter-clockwise rotation of actuator bracket 1106 similarly, through right jaw linkage 1102, causes right jaw coupler 1114 to rotate in a counter-clockwise direction, which in turn, as right jaw coupler 1114 is connected to right jaw 902, causes right jaw 902 to travel in a counter-clockwise direction along an arc centered about right jaw shaft 1110.

In other words, by rotating actuator bracket 1106 clockwise, left jaw 904 and right jaw 902 are brought together and jaws 902, 904 are closed, and by rotating actuator bracket 1106 counter-clockwise, left jaw 904 and right jaw 902 are brought apart and jaws 902, 904 are opened.

A skilled person in the relevant art will readily appreciate that the various components described herein, including actuator bracket 1106, linkage assembly 1008, left jaw 904 and right jaw 902, can be modified and configured to achieve various desired outcomes, including, for example, a configuration wherein rotation of actuator bracket 1106 (between a first and a second position) will give rise to a particular movement in left jaw 904 and right jaw 902 (between a first configuration and second configuration). Indeed, a skilled person in the relevant art will readily appreciate, for example, that the shape and size of right jaw linkage 1102 and left jaw linkage 1104, that the shape of right jaw coupler 1114 and left jaw coupler 1116 (including, in particular, connectors 1502, 1504, 1602, 1604 and the angle therebetween), and that the shape of left jaw 904 and right jaw 902 will all affect how jaws 902, 904 move (i.e. change configuration) in response to rotation of actuator bracket 1106 from a first position to a second position, and that a skilled person in the relevant art will be capable of selecting and configuring such components to cause jaws 902, 904 to move in a desirable way in response to a predetermined rotation of actuator bracket 1106. For example, all else being equal, the angle between upper connector 1604 and lower connector 1602 as depicted in FIGS. 10 and 11 may affect the initial and final position of left jaw 904 as a function of actuator bracket 1106 moving between a first and second position. More specifically, if the angle therebetween is reduced and the position of upper connector 1604 is maintained, the reduction in the angle would cause the initial and final position of left jaw 904 to be each further away from the front of croissant tool 900.

A skilled person in the relevant art will further readily appreciate that the various components described herein will, given any particular configuration, permit a limited amount of movement in the course of normal operation. That is, the various components, once assembled as depicted in, for example, FIG. 11, will generally permit a configuration wherein jaws 902, 904 are most open, and a configuration wherein jaws 902, 904 are most close together. A skilled person in the relevant art will readily by capable of selecting and configuring the various components so that the scope of movement is suitable for the desired use of croissant tool 900.

Figure 18A:
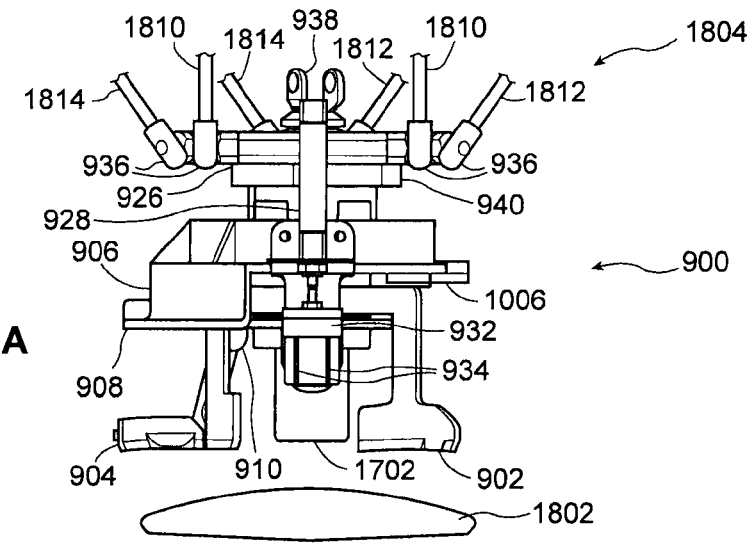
FIGS. 18A-18C are front views of the croissant tool depicted by FIG. 9A shaping a croissant.
Figure 18B:
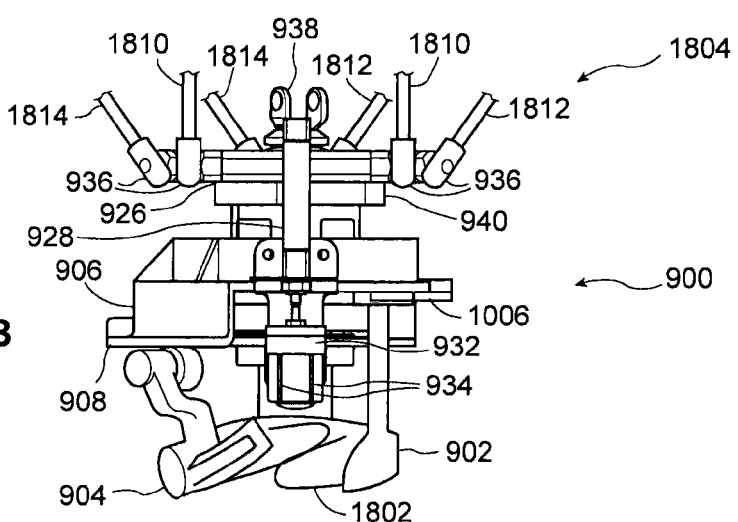
Figure 18C:
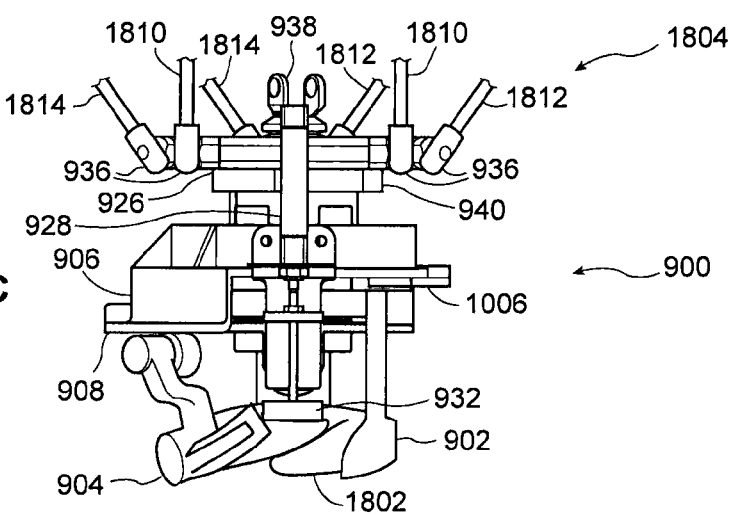

With reference to FIGS. 18A-18C, an example of such movement is depicted in the form of a sequential series of figures depicting the use of croissant tool 900 to form a croissant 1802. In particular, in FIG. 18A, jaws 902, 904 are spread apart and in FIGS. 18B and 18C, jaws 902, 904 are substantially closed. Although not depicted, following the configuration depicted by FIG. 18C, jaws 902, 904 may open up and return to the configuration depicted by FIG. 18A.

Although actuator bracket 1106 is not visible in FIGS. 18A-18C, the changes in the configuration of jaws 902, 904 may be achieved by rotating actuator bracket 1106. In particular, jaws 902, 904 may be brought together (i.e. go from the configuration depicted by FIG. 18A to the configuration depicted by FIG. 18B) by rotating actuator bracket 1106 in a clockwise direction, and jaws 902, 904 may be brought apart (i.e. go from the configuration depicted by FIG. 18B to the configuration depicted by FIG. 18A) by rotating actuator bracket 1106 in a counter-clockwise direction, each as described herein in greater detail.

Now with reference to FIGS. 9A-9C, 10, and 11, a further aspect of the present embodiment is described. As previously described, cover 906 is positioned overtop of and connected to chassis 1006. Such connection can be achieved, for example, by inserting bolts (not depicted) through corresponding bolt holes 920 of chassis 1006 and cover 906 and securely fixing such bolts (not depicted) with corresponding nuts (not depicted). A skilled person in the relevant art will readily appreciate that other means may be used to connect cover 906 and chassis 1006, including, without limitation, screws, rivets, and adhesives.

By positioning cover 906 overtop of chassis 1006 and connected therewith, inclined track 908 of cover 906 may be thereby positioned and configured to engage with roller 910 as depicted in FIGS. 9A and 9C. In particular, roller 910 may be configured to engage with lower surface 930 of inclined track 908 during the normal operation of croissant tool 900. Inclined track 908 may be generally positioned towards the front left corner of cover 906 to correspond with the position of roller 910, and left jaw 904 more generally, and may comprise inclined portion 922 and flat portion 924, inclined portion 922 angled upwards away from the plane of top surface 1007 of chassis 1006.

The engagement of roller 910 with lower surface 930 of inclined track 908 may have cooperative effect in conjunction with the aforedescribed opening and closing of jaws 902, 904. In particular, in the substantially closed configuration of jaws 902, 904 depicted by FIG. 9A, flat portion 924 of inclined track 908 is positioned, relative to roller 910, such that roller 910 is forced downwards towards chassis 1006, in turn causing left jaw lever scoop 1210 to be forced upwards, thereby elevating such. Such movement is linked as roller 910 is connected to left jaw lever arm 1208 which is fixedly connected to left jaw lever scoop 1210 about pivot 914.

In contrast, in the substantially open configuration of jaws 902, 904 depicted by FIG. 9C, inclined portion 924 of inclined track 908 is positioned, relative to roller 910, such that roller 910 is permitted upwards away from chassis 1006, in turn causing left jaw lever scoop 1210 to be permitted downwards, thereby lowering such. Such movement is again linked as roller 910 is connected to left jaw lever arm 1208 which is fixedly connected to left jaw lever scoop 1210 about pivot 914.

More generally, a skilled person in the relevant art will appreciate that inclined track 908 and roller 910 operate as a cam wherein inclined track 908 is a contoured cam surface and roller 910 is a roller follower. In particular, inclined track 908 and roller 910 may be configured so that roller 910 has various vertical displacements relative to chassis 1006 when roller 910 is positioned at various points along inclined track 908. Such differences in vertical displacement, as discussed above, may translate into movement in left jaw lever scoop 1210 as left jaw 904 travels along the aforedescribed arc centered about left jaw shaft 1112. In particular, as left jaw 904 travels from a configuration of being substantially open, as depicted by FIG. 9C, to a configuration of being substantially closed, as depicted by FIG. 9A, left jaw lever scoop 1210 of left jaw lever 1002 changes from lying in a first plane (e.g. substantially flat relative to the plane of top surface 1007 of chassis 1006 or, alternatively, substantially flat relative to a separate surface, not depicted) to lying in a second plane (e.g. elevated relative to the plane of top surface 1007 of chassis 1006 or, alternatively, elevated relative to a separate surface, not depicted).

A skilled person in the relevant art will further appreciate that the various components can be modified and configured to achieve a plurality of desired outcomes. For example, the shape and configuration of inclined track 908, the shape and configuration of the various components of left jaw 904, and the shape and configuration of linkage assembly 1008 are all factors that may affect the movement of left jaw lever scoop 1210 in response to movement of left jaw 904, ultimately in response to rotation of actuator bracket 1106 from a first position to a second position as described herein. Such skilled person will further appreciate that the mass of left jaw lever scoop 1210 may be sufficient to cause roller 910 to remain engaged with inclined track 908 through such movement. Alternatively, left jaw lever 1002 may be externally biased about pivot 914 in order to cause roller 910 to remain engaged with inclined track 908, for example, by use of a spring biased to cause left jaw lever 1002 to rotate in a clockwise direction when left jaw lever 1002 is viewed from the front-left.

To further depict the operation of the cam, with reference to FIG. 18A, at this step in the process of shaping croissant 1802 (that is resting upon a flat surface not depicted), it is apparent that jaws 902, 904 are in an opened configuration and left jaw lever scoop 1210 lies flat relative to the surface (not depicted) that croissant 1802 rests upon. In contrast, with reference to FIG. 18B, at this step in the process of shaping croissant 1802, it is apparent that jaws 902, 904 are in a closed configuration and left jaw lever scoop 1210 has been elevated relative to surface 1806 (see, for example, gap 1808).

A skilled person in the relevant art will further appreciate that other means may be used to effect the lifting of left jaw lever scoop 1210. For example, instead of roller 910 engaging with inclined track 908, an electric stepper motor or a piston may be used to cause left jaw lever scoop 1210 to be elevated concurrently with movement of left jaw 904.

Cover 906 is further configured to have piston mount holes 1018 that permit the attachment of L-shaped piston mount 916 using, for example, screws or bolts (not depicted). Piston 928 may be attached to piston mount 916 and may be of a standard type and configuration; for example, piston 928 may be a pneumatic or hydraulic piston well known to those persons skilled in the relevant art. Piston 928 may also be independently controlled by means of a connection (not depicted) to a separate controller (not depicted). Piston 928 may further comprise piston head 932 and piston head pins 934, piston head 932 and piston head pins 934 positioned and configured to move in a vertical axis.

As described herein, piston 928 may be used to press down upon a croissant (e.g. croissant 1802) and may have, on its distal surface that directly contacts other objects (e.g. croissant 1802), a felt or Teflon covering (not depicted). Optional piston head pins 934 may further be used to penetrate suitable objects (e.g. croissant 1802), as described herein. A skilled person in the relevant art will be readily capable of selecting and configuring a suitable piston, including synchronizing the operation of such together with the movement of jaws 902, 904 or croissant tool 900 more generally. More generally, piston 928 may be altogether optional, as illustrated by FIG. 9A wherein no piston is depicted.

With reference to FIGS. 9A-C, 10, 11, and 18A-C, croissant tool 900 may be adapted to be connected to a robot, such as delta robot 1804. In illustrative embodiments of the present invention, delta robot 1804 may be, for example, a robot known as a delta robot that is well known to persons of skill in the relevant art. Typically, delta robots have four degrees of freedom in respect of an end effector: the end effector may be translated within a three-dimensional (3D) volume while maintaining its planar orientation relative to an arbitrary surface, along with a further capacity to rotate the end effector within such plane. In other words, delta robots typically have the ability to place a tool anywhere within a 3D volume while further having the ability to rotate such tool. In illustrative embodiments of the present invention, delta robot 1804 may be, for example, a FlexPicker IRB360™ available from ABB™.

Figure 1:
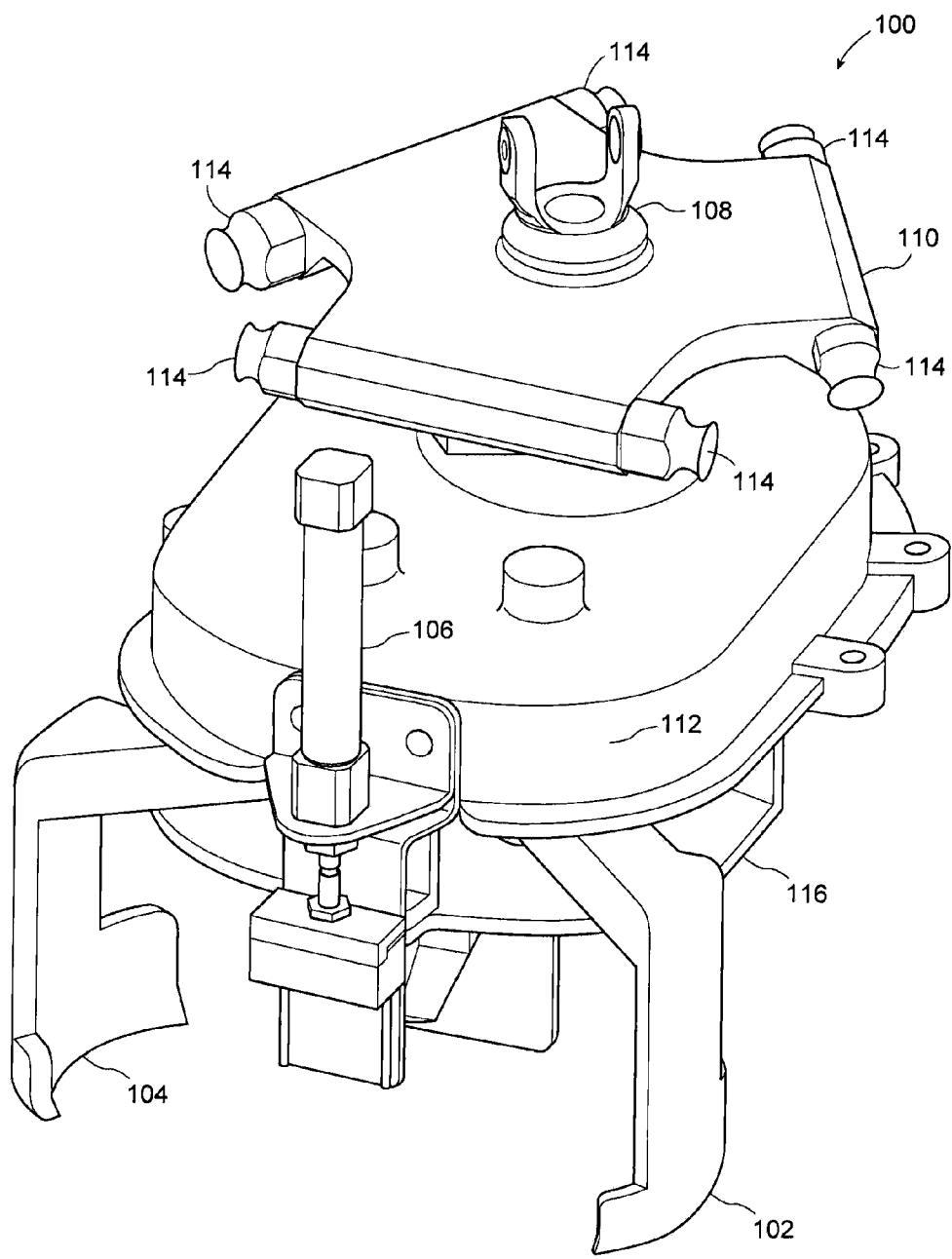
FIG. 1 is a perspective view from the above and to the right of a croissant tool in accordance with a first illustrative embodiment of the present invention.
Figure 2:
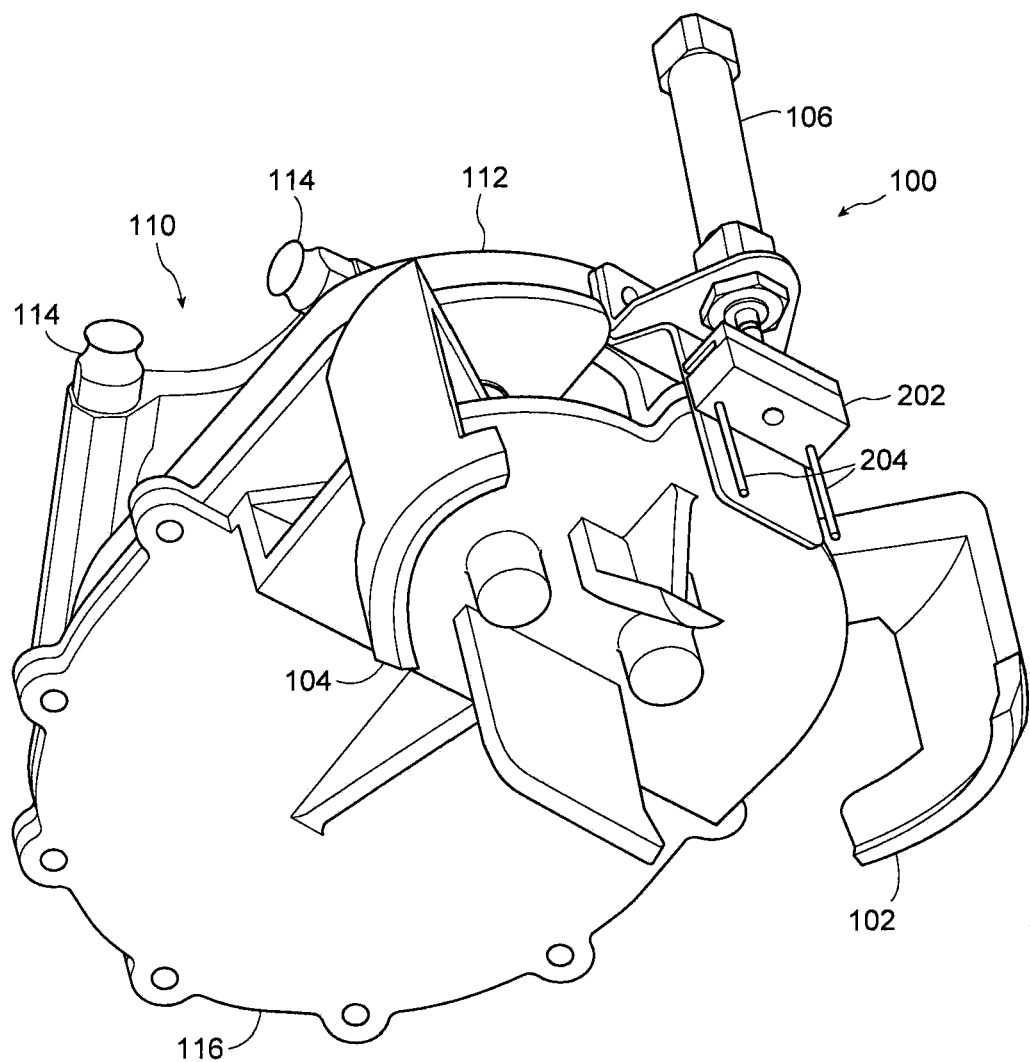
FIG. 2 is a perspective view from the below and to the left of the croissant tool depicted by FIG. 1.
Figure 3:
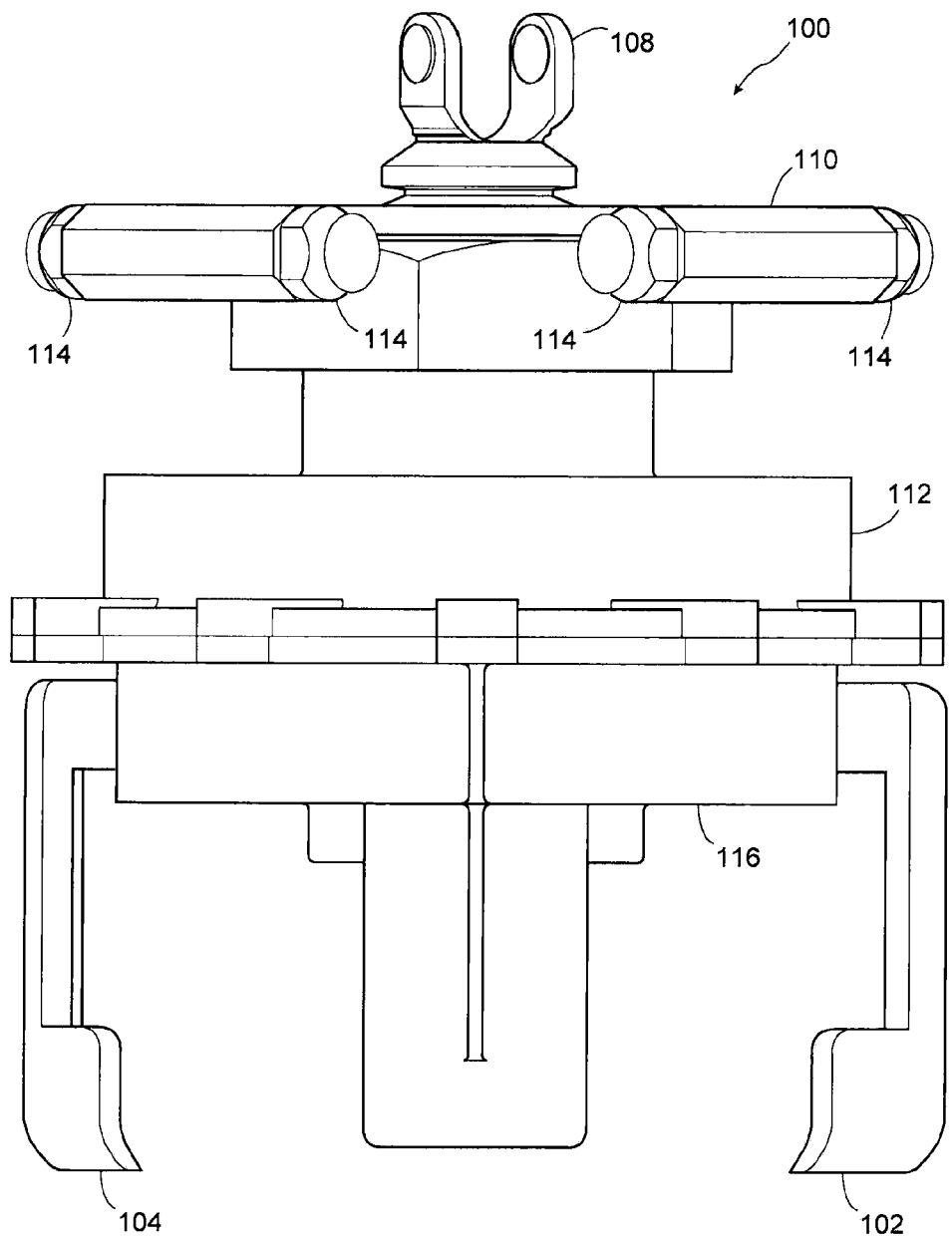
FIG. 3 is a rear view of the croissant tool depicted by FIG. 1.
Figure 4:
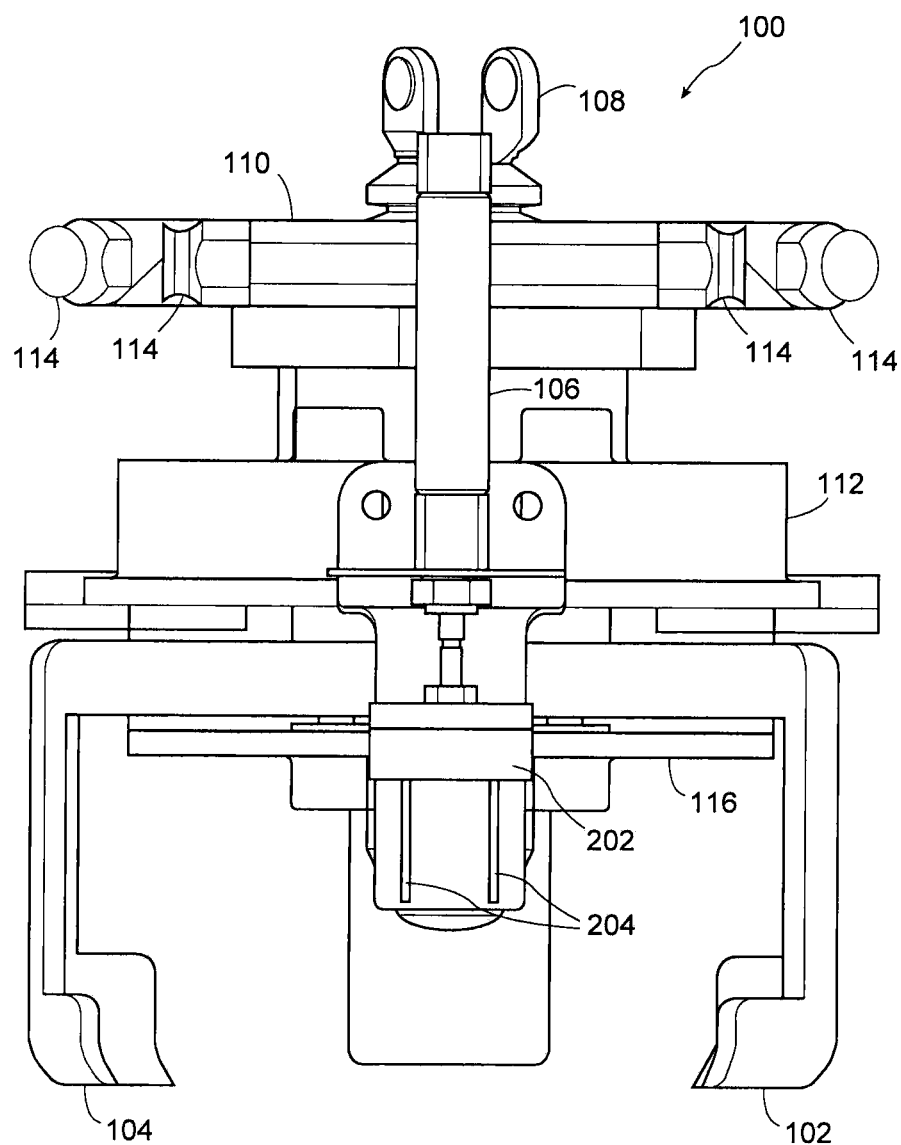
FIG. 4 is a front view of the croissant tool depicted by FIG. 1.
Figure 5:
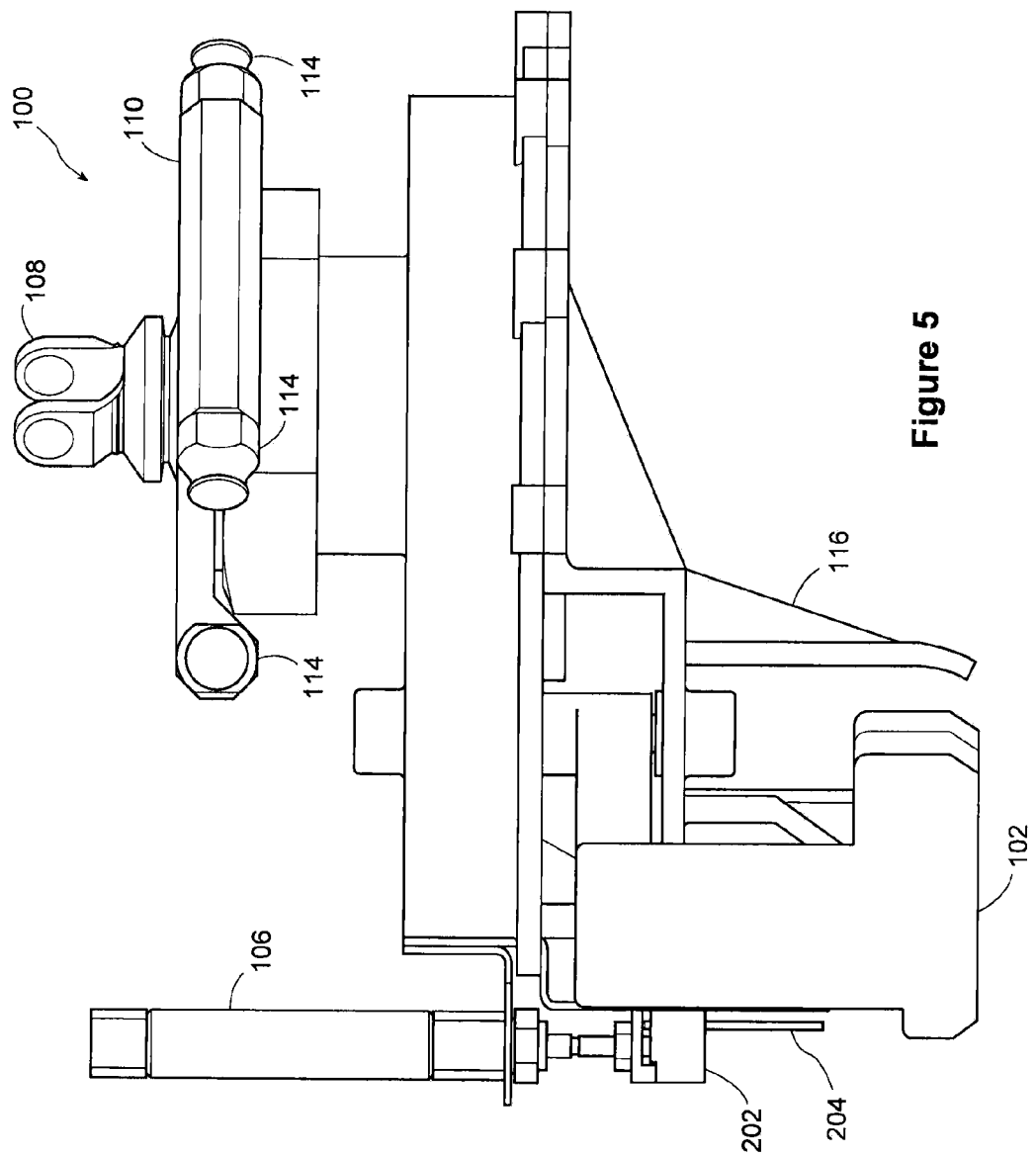
FIG. 5 is side view from the right of the croissant tool depicted by FIG. 1.
Figure 6:
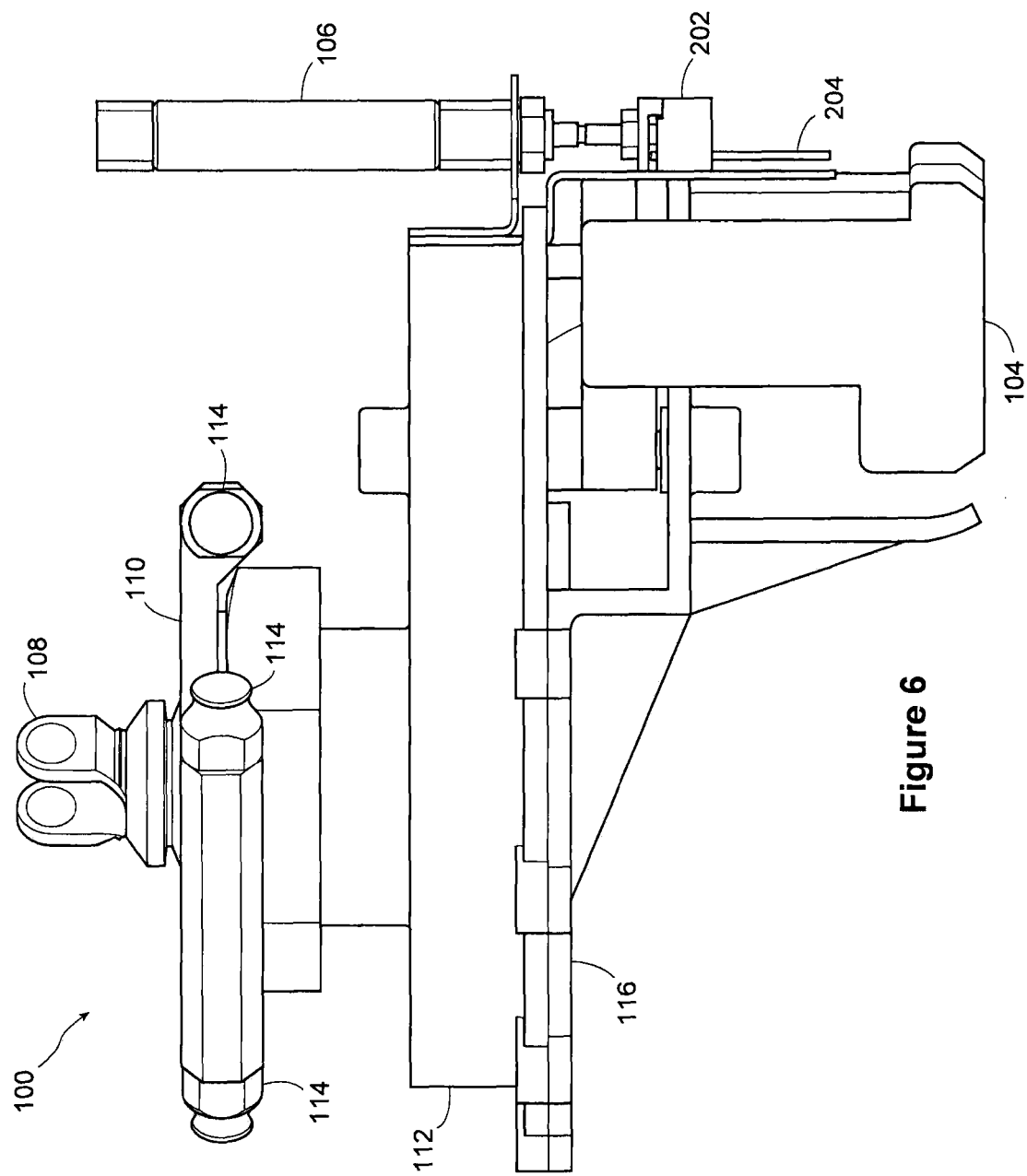
FIG. 6 is a side view from the left of the croissant tool depicted by FIG. 1.
Figure 7:
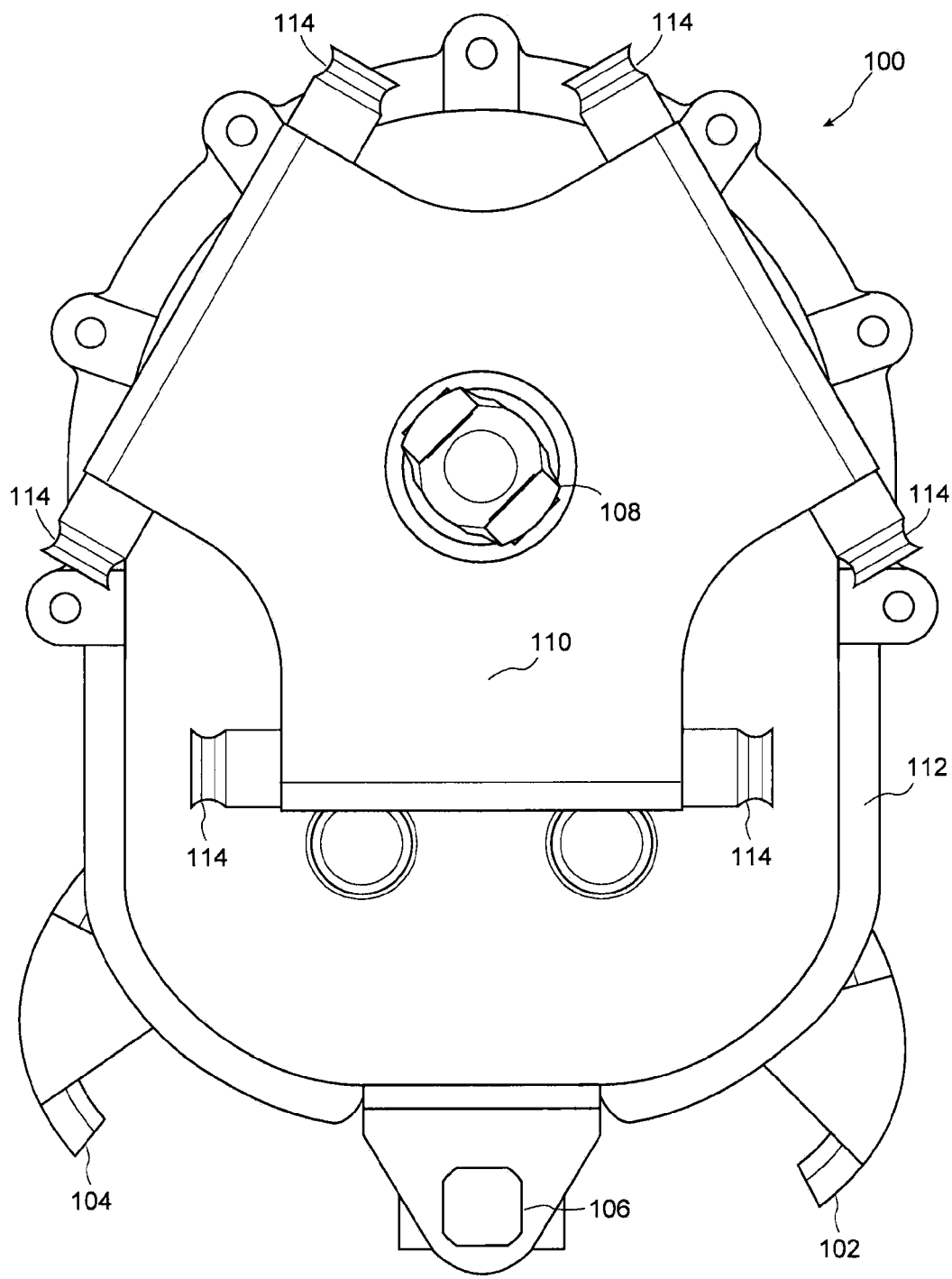
FIG. 7 is a top view of the croissant tool depicted by FIG. 1.
Figure 8:
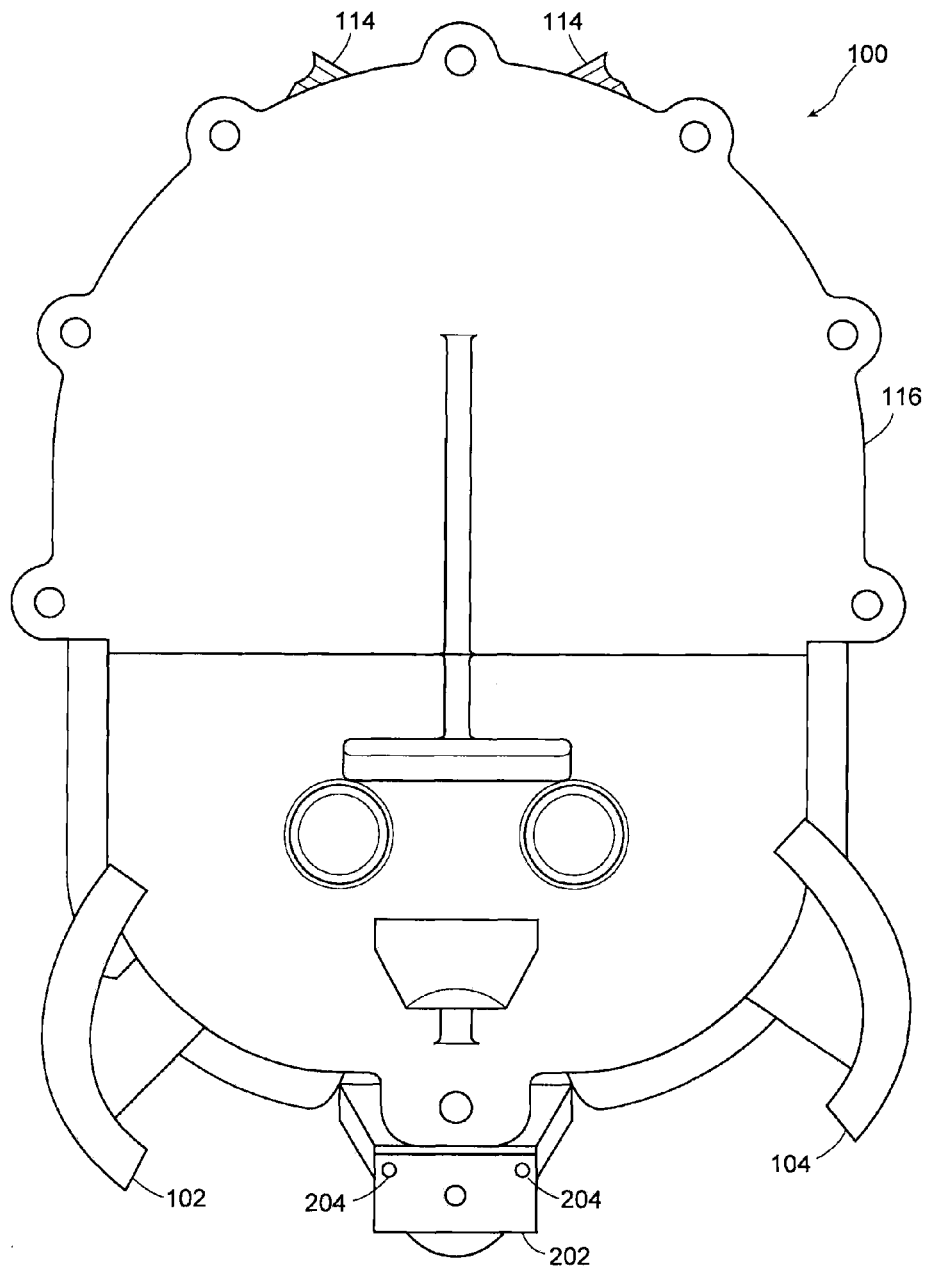
FIG. 8 is a bottom view of the croissant tool depicted by FIG. 1.

Connection between croissant tool 900 and delta robot 1804 may be achieved through any number of methods well known to those skilled in the relevant art. In illustrative embodiments of the present invention and with particular reference to FIGS. 9B and 9C, croissant tool 900 further comprises robot attachment plate 926 for facilitating such connection, robot attachment plate 926 comprising robot arm attachment points 936 and yoke 938. While FIGS. 1-8 illustrate an alternative embodiment of the present invention described in greater detail herein, FIG. 1 provides an alternative view of a substantially identical robot attachment plate, namely, robot attachment plate 110, depicting corresponding robot attachment points 114 and yoke 108.

FIGS. 18A-18C depict an embodiment wherein croissant tool 900 is operatively connected to delta robot 1804. In such embodiment (and as is typical for delta robots), delta robot 1804 comprises three pairs of arms, arms 1810 comprising a first pair of arms, arms 1812 comprising a second pair of arms, and arms 1814 comprising a third pair of arms. Arms 1810, 1812, and 1814 are respectively connected to robot attachment points 936 of robot attachment plate 926, a skilled person in the relevant art readily capable of selecting suitable means of connection that permit sufficient freedom of movement. For example, arms 1810, 1812, and 1814 may be connected to robot attachment points 936 using a ball joint.

Additionally, delta robot 1804 may be operatively connected to yoke 938 by means of a further arm (not depicted). Such arm may be capable only of rotation, and may be connected to yoke 938 such that rotation of such arm effects rotation of yoke 938. A skilled person in the relevant art will also be readily capable of connecting such robot arm to yoke 938 so as to permit sufficient freedom of movement.

Robot attachment plate 926 is itself connected to cover 906 by means of a connection to access port 918 of cover 906. In particular, robot attachment plate 926 may have threaded nut 940 rotatably attached to the lower surface thereof, threaded nut 940 sized and adapted to correspond to thread 942 of access port 918. Once threaded nut 940 is tightened onto thread 942 of access port 918, cover 906 and robot attachment plate 926 may be connected in a rotational fixed manner during normal operation.

Additionally, a shaft (not shown) may extend downwards from yoke 938, through robot attachment plate 926, and connect with actuator bracket 1106. A skilled person in the relevant art will be readily capable of selecting and configuring a suitable shaft and connection means such that rotation of yoke 938 effects corresponding rotation of actuator bracket 1106 (such rotation which in turns effects movement of jaws 902, 904 as described herein).

In the illustrative embodiment of the present invention, the connection means between delta robot 1804 and croissant tool 900 described above result in a connection therebetween wherein croissant tool 900 as a whole is not capable of rotating relative to delta robot 1804. Instead, by means of arms 1810, 1812, and 1814, delta robot 1804 may be used to place croissant tool 900 anywhere within a given 3D volume while maintaining the orientation of croissant tool 900 parallel to a given plane (e.g. the flat surface upon which croissant 1802 rests). Furthermore, by using the standard capability of delta robot 1804 to effect a rotation, actuator bracket 1106 may be caused to rotate back-and-forth, thereby opening and closing jaws 902, 904 as described herein. In other words, in the illustrative embodiment of the present invention, croissant tool 900 is adapted to use the existing capabilities of delta robot 1804 such that croissant tool 900 may be placed anywhere within a given 3D volume, and to further drive the opening and closing of jaws 902, 904 of croissant tool 900.

A skilled person in the relevant art will also appreciate that other means for effecting the positioning of croissant tool 900 and rotation of actuator bracket 1106 may be used. For example, delta robots having a different number of degrees of freedom may be used. In other embodiments, a humanoid-type robot arm may be used to position croissant tool 900, and a separate electric stepper motor or piston may be used to rotate actuator bracket 1106.

A skilled person in the relevant art would further readily appreciate that delta robot 1804 may comprise additional components or be connected to additional components. For example, delta robot 1804 may be mounted above a given work area, to a stationary mount or a movable mount capable of movement within a plane. Delta robot 1804 may also be operatively connected to electronic components (e.g. computers) executing software for controlling delta robot 1804. Delta robot 1804 may further have additional sensors such as cameras, the software controlling delta robot 1804 potentially receiving and processing input from such sensors to aid in the control of delta robot 1804.

For example, with reference to FIGS. 18A-18C, is it well within the capabilities of a skilled person in the relevant art to use computer vision and robot control technology to cause delta robot 1804 to (a) identify the position and configuration of an object (such as croissant 1802 resting on a surface), (b) position croissant tool 900 to be in close proximity with the object, (c) effect, as described herein, the closing of jaws 902, 904 of croissant tool 900 so as to shape the object in a desirable manner, (d) effect, as described herein, the opening of jaws 902, 904 of croissant tool 900 to disengage croissant tool 900 from the object, and (e) position croissant tool 900 away from such object. Such would be readily possible even where the object is resting on a moving surface during steps (a) to (e) described above (e.g. delta robot 1804 may be configured to position croissant tool 900 so as to track the movement of the object).

An example of the operation of croissant tool 900 and delta robot 1804 to shape a croissant is depicted by FIGS. 18A-18C. Croissant 1802 may be resting upon a flat surface (not depicted) such as a conveyor belt. Prior to the operation described herein, croissant 1802 is formed and shaped into a substantially tubular form, potentially by hand or by another mechanical operation or process, as depicted in FIG. 18A.

FIG. 18A depicts the positioning of croissant tool 900 directly above croissant 1802. Such positioning is performed by delta robot 1804 using the aforesaid combination of computer vision and robot control technology and a description of such is outside the scope of the present disclosure. Additionally, computer vision and robot control technology may be used to identify the center of croissant 1802 as defined by metric deemed preferable by a skilled person in the relevant art, and position croissant tool 900 adjacent to such center of croissant 1802. For example, the center of croissant 1802 could be defined to be the thickest portion of croissant 1802, and croissant tool 900 could be positioned such that the center of optional rear deflector 1702 is immediately adjacent to and centered about such center of croissant 1802. As depicted in FIG. 18A, at this point prior to engaging croissant 1802, right jaw 902 and left jaw 904 are spread apart.

As between FIG. 18A and FIG. 18B, croissant tool 900 is first lowered down to surround croissant 1802. Again, such positioning is performed by delta robot 1804 using the aforesaid combination of computer vision and robot control technology. Croissant tool 900 may be positioned so that optional rear deflector 1702, right jaw 902, and left jaw 904 are all positioned immediately adjacent to croissant 1802.

After being lowered down to surround croissant 1802, jaws 902, 904 of croissant tool 900 are brought together, bringing jaws 902, 904 into engagement with croissant 1802 to shape croissant 1802 into a crescent or toroidal shape (a toroidal shape is depicted in FIG. 18B). Such movement may be effected, as discussed above, by delta robot 1804 driving the rotation of actuator bracket 1106 through yoke 938.

The presence of lips 1302, 1202, and 1402 may operate to cause jaws 902, 904 to better engage with croissant 1802; in particular, lips 1302, 1202, and 1402 may slightly slide under croissant 1802 to better facilitate engagement between croissant 1802 and jaws 902, 904.

Figure 12:
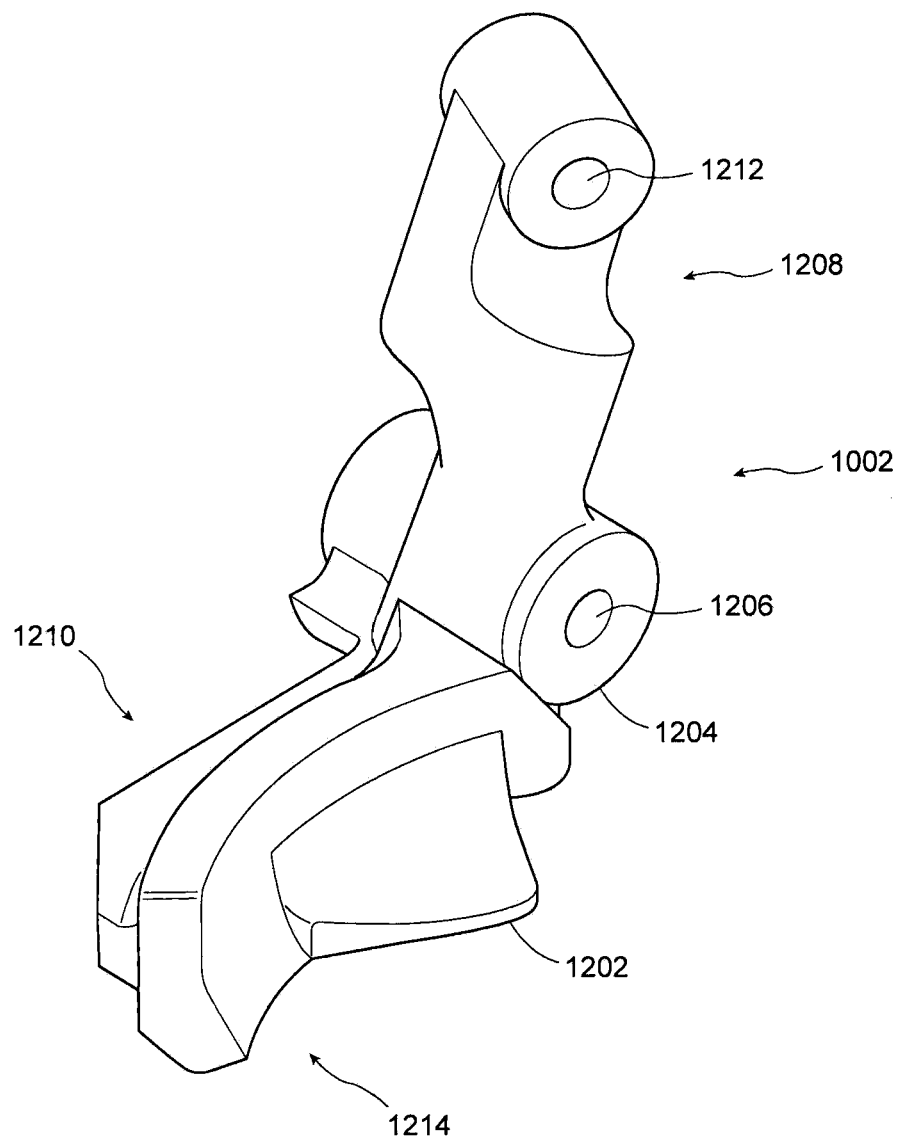
FIG. 12 is a perspective view of the left jaw lever of the croissant tool depicted by FIG. 9A.

As depicted in FIG. 18B and as described herein, left jaw lever scoop 1210 of left jaw 904 is elevated when jaw 904 is the closed configuration, thereby in turn elevating a tip of croissant 1802. In particular, such tip of croissant 1802 may be lifted above and over the tip of croissant 1802 that engages with right jaw 902. Additionally, left jaw lever lip 1202, as depicted in FIG. 12 in isolation, may be configured to be substantially larger than right jaw lip 1302 as left jaw lever lip 1202 may be designed to facilitate the vertical lifting of a tip of croissant 1802, whereas right jaw lip 1302 may be designed to merely improve horizontal movement of a tip of croissant 1802. Curved portions 1312, 1214 may similarly be designed to facilitate the movement, elevation, and shaping of croissant 1802.

FIG. 18C further depicts the operation of piston 928 to press together the tips of croissant 1802. Upon actuator of piston 928, piston head 932 may be brought into contact with the tip of croissant 1802 supported by left jaw lever scoop 1210 to press together such upper tip with the tip of croissant 1802 engaging with right jaw 902. A skilled person in the relevant art will readily appreciate that piston 928 may be configured to press together the tips of croissant 1802 with an appropriate amount of force in the circumstances. Optional piston head pins 934 may be configured to penetrate the tips of croissant 1802 when piston head 932 is in contact therewith.

Following the steps depicted by FIGS. 18A-18C, croissant tool 900 may be operated to return to the configuration depicted by FIG. 18A (except that croissant 1802 remains in the shape depicted by FIG. 18C).

In particular, jaws 902, 904 may be first opened (i.e. brought apart) through croissant tool 900 again effecting rotation of yoke 938 as described herein. By opening jaws 902, 904, jaws 902, 904 are disengaged from croissant 1802. Piston head 932 may then lifted to also disengage with croissant 1802. Option piston head pins 934 may also cease to penetrate the tips of croissant 1802 after piston head 932 is returned to its original position. A skilled person in the art will appreciate that by having piston head 932 (and potentially piston head pins 934) engaging with croissant 1802 while jaws 902, 904 are opened may assist in disengagement of jaws 902, 904 from croissant 1802.

Delta robot 1804 may lift and position croissant tool 900 away from croissant 1802. For example, delta robot 1804 may lift and position croissant tool 900 above another croissant in tubular form (not depicted), and repeat the aforedescribed process to shape such croissant into, as described herein, a toroidal shape having tips that overlap.

A skilled person in the relevant art will appreciate that croissant tool 900 may be configured to shape croissant 1802 in various ways. For example, jaws 902 and 904 may be configured to shape croissant 1802 in such a way that the tips of croissant 1802 merely touch, but do not overlap. In other embodiments, jaws 902, 904 may be configured to shape croissant 1802 into merely a crescent shape wherein the tips of croissant 1802 to not touch.

A skilled person in the relevant art will further appreciate that piston 928 may be altogether optional. For example, jaws 902, 904 may be configured so that jaws 902, 904 themselves squeeze or pinch together the tips of croissant 1802 without need for piston 928.

An alternative embodiment of the present invention is illustrated by FIGS. 1-8. Such embodiment is substantially similar in construction to the embodiment described with reference to the remaining figures, except that left jaw 104 has substantially similar construction to right jaw 102 instead of having the aforedescribed cam and related components that effect the lifting of a scoop of left jaw 104. Accordingly, in this alternative embodiment, left jaw 104 is not configured to directly engage with cover 112 and does not elevate a tip of a croissant. Instead, by bringing together jaws 102, 104 using substantially the same internal mechanical mechanism as described herein, such croissant would only be bent together into a toroidal or crescent shape.

The alternative embodiment of the present invention illustrated by croissant tool 100 may be otherwise constructed and operated in substantially the same manner as described herein. For example, croissant tool 100 may comprise chassis 116, cover 112, jaws 102, 104, robot attachment plate 100 having robot attachment points 114 and yoke 108, and piston 106 having piston head 202 and optional piston head pins 204. Croissant tool 100 may also be connected to a delta robot for positioning and operation, as described herein.

Within this disclosure various components have been described as connected or attached together. In some cases, components (e.g. shafts) may be retained in position by virtue of their placement within or abutting other components. A skilled person in the art will appreciate that additional retention/connection means may also be used, such as retention rings or lips, and that other components may also be used (e.g. ball bearings) to improve the connection and interaction between the components. For example, lower surface 930 of inclined track 908 may have a groove or other retention means adapted to better engage with and guide roller 910. Similarly, a skilled person in the art will readily appreciate that many different retention/connection means may be used, such as screws, bolts, adhesives, and welding, and that various other components may be used (e.g. washers) to improve the connection and interaction between the components. More generally, it will be appreciated that some connections and attachments may be intended to be permanent, that other such connections and attachments may be intended to be only temporary, and that suitable connections and attachment means may be selected by a skilled person to achieve such. Still further, a skilled person in the relevant art will appreciate that while certain components may be depicted and described herein as have a unibody construction, such components may be instructed of multiple components. For example, robot attachment plate 926 may be readily constructed of a plurality of components.

A skilled person in the relevant art will further appreciate that it may be useful in certain circumstances to use lubricants and greases to facilitate the mechanical interaction between the components. Such skilled person will appreciate, however, that where embodiments of the present invention are to be used in the preparation of food, such as croissants, that components and materials used in association therewith should comply with all applicable food and safety regulations.

A skilled person in the relevant art will further appreciate that such obligation extends to the materials used to construct embodiments of the present invention. More generally, however, the various components described herein may be constructed from various materials, including, without limitation, plastics, metals, and ceramics.

A skilled person in the relevant art will further appreciate that while in the illustrative embodiment of the present invention depicted by FIG. 9A left arm 904 is adapted to be elevated, in other embodiments of the present invention, neither arm may be so adapted (as depicted in FIG. 1), only right arm 902 may be so adapted, or both arms may be so adapted.

Other types of foods may also be prepared using embodiments of the apparatus described herein. For example, cookies and cakes may also be shaped using embodiments of the present invention A skilled person in the relevant art will further appreciate that embodiments of the present invention may be used to maneuver croissants (or other food products) more generally, instead of being merely used for shaping purposes. For example, once jaws 902, 904 are brought together around a product (e.g. croissant 1802), the whole of croissant tool 900 may be moved by delta robot 1804, thereby causing the product to move together therewith. This may be used, for example, in circumstances such as when products are required to be moved for packing or preparation purposes. A skilled person in the relevant art will appreciate that the shape of jaws 902, 904 could be readily modified to better facilitate using croissant tool 900 for maneuvering food products, such as by enlarging lips 1302, 1202, and 1402.

All publications and patent applications mentioned in this specification are herein incorporated by reference to the same extent as if each individual publication or patent application was specifically and individually incorporated by reference.

While the foregoing disclosure has been described in some detail for purposes of clarity and understanding, it will be appreciated by one skilled in the art, from a reading of the disclosure, that various changes in form and detail can be made without departing from the true scope of the disclosure.

What is claimed is:

1. An apparatus for manipulating a food item, said apparatus comprising:
   a chassis;
   a cover connected to said chassis, wherein said cover comprises an inclined track;
   an actuator connected to said chassis and rotatable about a pivot;
   a first jaw connected to said chassis and mechanically linked to said actuator, wherein said first jaw is adapted to move along a first arc;
   a second jaw connected to said chassis and mechanically linked to said actuator, wherein said second jaw is adapted to move along a second arc;
   wherein rotation of said actuator about said pivot in a first direction brings together said first jaw and said second jaw, said first and second jaws moving along said first and second arcs, respectively; and
   wherein rotation of said actuator in a second direction opposite said first direction brings apart said first jaw and said second jaw, said first and second jaws moving along said first and second arcs, respectively.

2. The apparatus of claim 1 wherein said second jaw comprises a scoop that can be elevated, and wherein said scoop is elevated together with rotation of said actuator about said pivot in said first direction.

3. The apparatus of claim 2 wherein said second jaw further comprises a roller, wherein said roller and said scoop are connected about a pivot, and wherein said roller engages with said inclined track during rotation of said actuator about said pivot in said first direction so that said scoop is elevated concurrently with such rotation.

4. The apparatus of claim 3 wherein said roller engages with said inclined track during rotation of said actuator about said pivot in said second direction so that said scoop is lowered concurrently with such rotation.

5. The apparatus of claim 4 wherein said food item is a croissant, and wherein said bringing together of said first jaw and said second jaw is adapted to shape said croissant.

6. The apparatus of claim 5 wherein said elevation of said scoop is adapted to cause a first tip of said croissant to overlap a second tip of said croissant.

7. The apparatus of claim 6 further comprising a piston connected to said apparatus, and wherein said piston is adapted to press together said first and second tip of said croissant.

8. The apparatus of claim 7 wherein said bringing apart of said first jaw and said second jaw is adapted to release said croissant.

9. The apparatus of claim 1 further comprising a robot attachment plate adapted to connected to a robot.

10. The apparatus of claim 9 wherein said robot is a delta robot having a rotation capability.

11. The apparatus of claim 10 wherein rotation of said actuator in said first and second directions may be effected by said delta robot using said rotation capability.

12. The apparatus of claim 11 wherein said apparatus is adapted to be connected to said delta robot so that said chassis is rotationally fixed relative to said delta robot.

13. The apparatus of claim 12 further comprising a yoke connected to said actuator, wherein rotation of said yoke effects rotation of said actuator, where said yoke is adapted to be connected to a rotatable arm of said delta robot.

* * * * *